(12) United States Patent
Takashima et al.

(10) Patent No.: US 8,310,804 B2
(45) Date of Patent: Nov. 13, 2012

(54) MONOLITHIC CERAMIC CAPACITOR

(75) Inventors: Hirokazu Takashima, Echizen (JP);
Hiroshi Ueoka, Echizen (JP);
Yoshikazu Takagi, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 261 days.

(21) Appl. No.: 12/125,394

(22) Filed: May 22, 2008

(65) Prior Publication Data
US 2008/0291600 A1    Nov. 27, 2008

(30) Foreign Application Priority Data

May 22, 2007 (JP) ................................. 2007-135234
Feb. 27, 2008 (JP) ................................. 2008-045467

(51) Int. Cl.
*H01G 4/005* (2006.01)
*H01G 4/228* (2006.01)
*H01G 4/06* (2006.01)

(52) U.S. Cl. ................... 361/303; 361/321.2; 361/306.3

(58) Field of Classification Search ............... 361/321.3, 361/321.2, 303, 301.4, 306.2, 306.3, 306.1, 361/308.1, 309, 310, 313, 312, 311, 321.1
See application file for complete search history.

(56) References Cited

U.S. PATENT DOCUMENTS

| | | | | |
|---|---|---|---|---|
| 6,819,543 B2 * | 11/2004 | Vieweg et al. | ............. | 361/306.3 |
| 7,088,569 B1 * | 8/2006 | Togashi et al. | ................ | 361/303 |
| 7,145,429 B1 * | 12/2006 | Togashi et al. | ................ | 336/200 |
| 7,203,054 B2 * | 4/2007 | Togashi | ......................... | 361/303 |
| 7,283,348 B2 * | 10/2007 | Togashi et al. | ............. | 361/321.2 |
| 7,411,776 B2 * | 8/2008 | Aoki | ........................... | 361/306.3 |
| 7,428,135 B2 * | 9/2008 | Togashi et al. | ................ | 361/303 |
| 7,436,648 B2 * | 10/2008 | Togashi | ......................... | 361/303 |
| 7,576,968 B2 * | 8/2009 | Ritter et al. | ................ | 361/306.3 |
| 2005/0201040 A1 * | 9/2005 | Ahiko et al. | ................ | 361/321.2 |
| 2006/0187612 A1 | 8/2006 | Yamane et al. | | |
| 2007/0047176 A1 | 3/2007 | Togashi | | |
| 2007/0247783 A1 * | 10/2007 | Shimizu et al. | ............... | 361/303 |

FOREIGN PATENT DOCUMENTS

| | | |
|---|---|---|
| CN | 1815643 A | 8/2006 |
| CN | 1921039 A | 2/2007 |
| JP | 11-16776 A | 1/1999 |
| JP | 2002-151349 A | 5/2002 |
| JP | 2003-318066 A | 11/2003 |
| JP | 2003-347161 A | 12/2003 |
| JP | 2006-229064 A | 8/2006 |
| JP | 2006-278649 A | 10/2006 |

OTHER PUBLICATIONS

Machine translation of JP2003347161.*
Official Communication issued in corresponding Japanese Patent Application No. 2008-045467, mailed on Oct. 6, 2009.
Official Communication issued in corresponding Chinese Patent Application No. 200810107945.8, mailed on Oct. 13, 2010.

* cited by examiner

*Primary Examiner* — David M Sinclair
(74) *Attorney, Agent, or Firm* — Keating & Bennett, LLP

(57) ABSTRACT

A multi-terminal monolithic ceramic capacitor arranged to reduce an equivalent series inductance and having an array structure is provided. A first same-polarity-connection conductor and a second same-polarity-connection conductor are provided inside a capacitor body so as to extend over at least two capacitors. The first same-polarity-connection conductor is electrically connected to a plurality of first external terminal electrodes, and the second same-polarity-connection conductor is connected to a plurality of second external terminal electrodes. In the monolithic ceramic capacitor which is mounted on a wiring substrate, the overall capacitance can be maintained even if an accident, such as cracking of a solder joint, occurs in one of the external terminal electrodes.

34 Claims, 14 Drawing Sheets

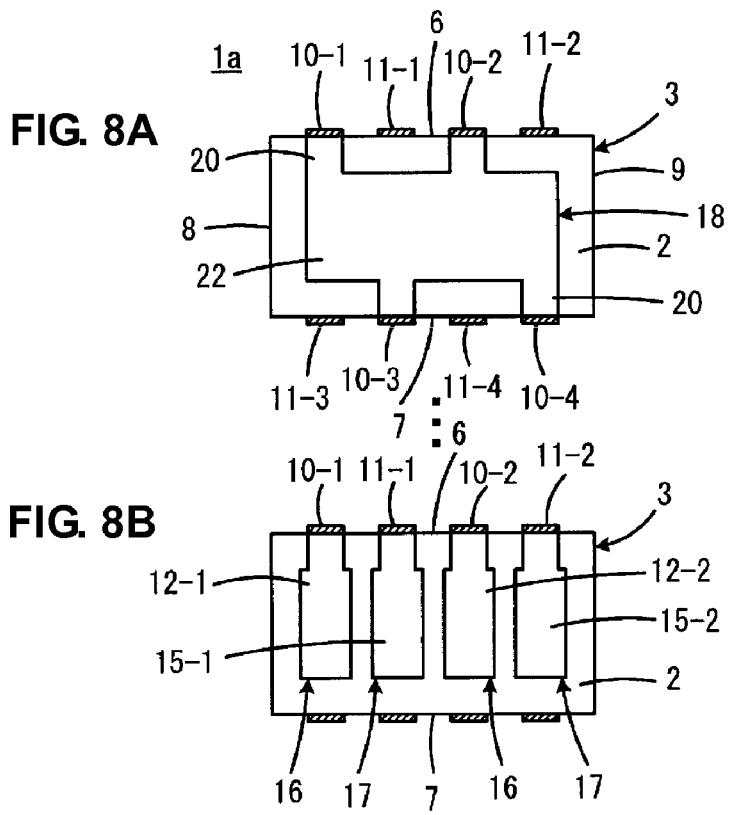

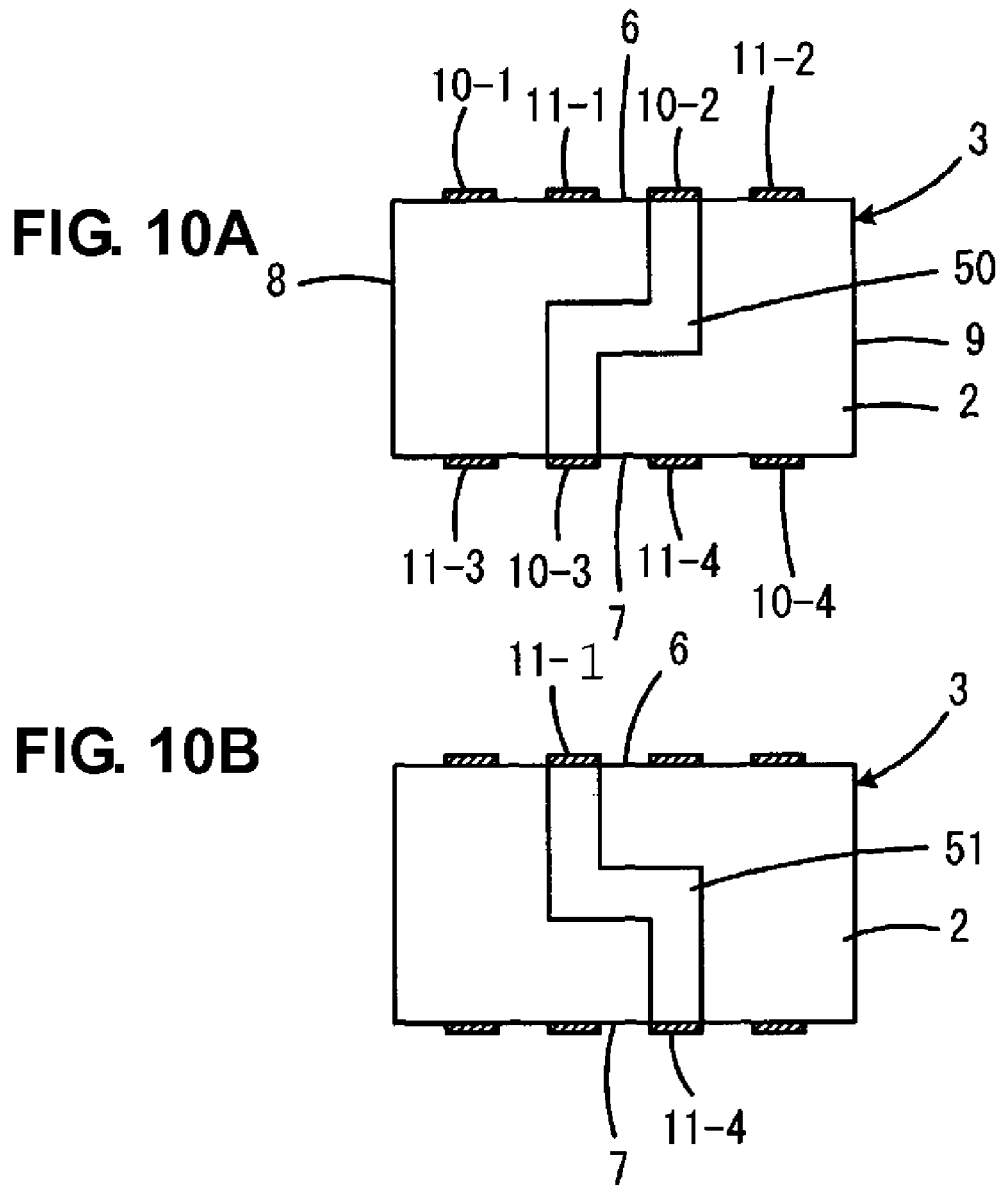

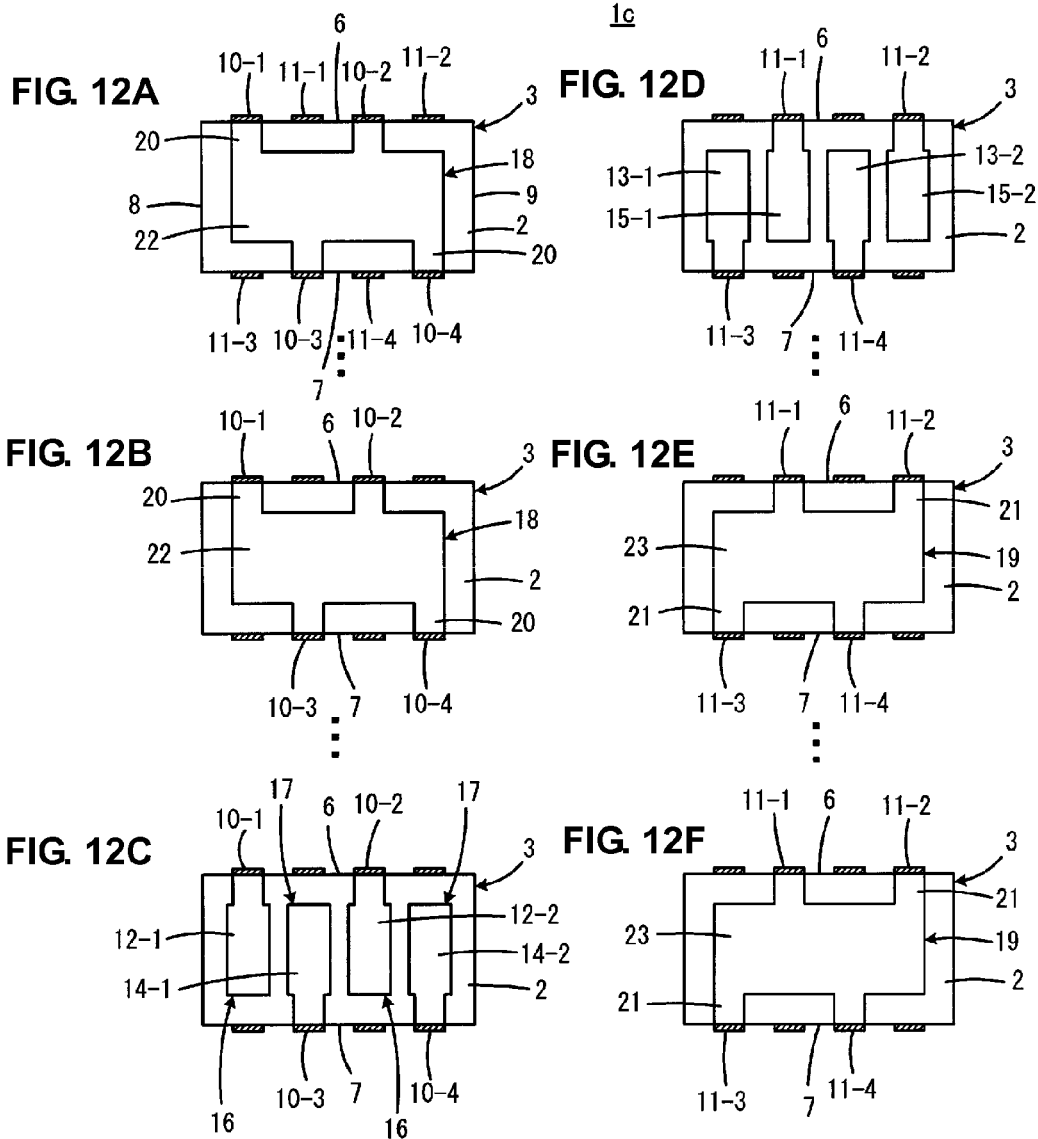

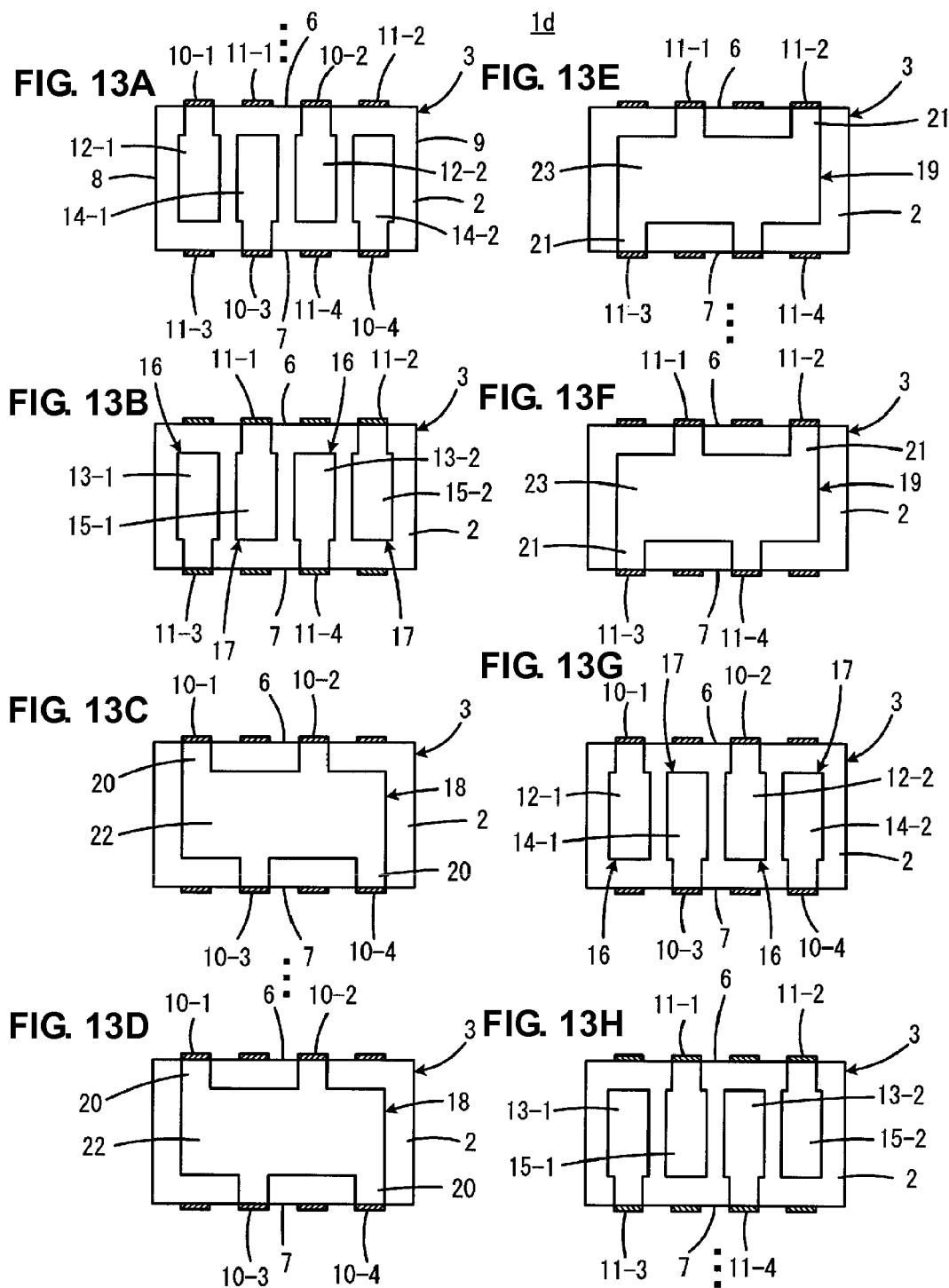

⋮

⋮

MONOLITHIC CERAMIC CAPACITOR

BACKGROUND OF THE INVENTION

1. Field of the Invention

The present invention relates to a monolithic ceramic capacitor. More specifically, the present invention relates to a multi-terminal monolithic ceramic capacitor arranged to reduce an equivalent series inductance (ESL).

2. Description of the Related Art

In a power supply circuit, an increase in voltage variations in a power supply line due to the presence of impedance in the power supply line or a ground may cause an unstable operation of circuits, interference between the circuits through the power supply circuit, or oscillation. In order to address such problems, a decoupling capacitor is typically connected between the power supply line and the ground. The decoupling capacitor reduces the impedance between the power supply line and the ground to suppress variations in power supply voltage or interference between the circuits.

Recently, in communication devices, such as mobile phones, or information processing devices, such as personal computers, the signal transmission speed has increased in order to process a large amount of information, and the clock frequency of an integrated circuit (IC) used therewith has also increased. Accordingly, noise including a large number of harmonic components is likely to occur, and therefore, it is necessary to provide more effective decoupling for an IC power supply circuit.

In order to increase the decoupling effect, it is effective to use a decoupling capacitor having outstanding impedance-frequency characteristics. An example of such a decoupling capacitor is a monolithic ceramic capacitor. Because of their low ESL, the monolithic ceramic capacitors have an outstanding noise-absorbing effect over a wide frequency band as compared to the electrolytic capacitors.

Such a monolithic ceramic capacitor suitable for decoupling is disclosed in, for example, Japanese Unexamined Patent Application Publication No. 2003-318066. In the disclosed monolithic ceramic capacitor, a potential is applied to some capacitors in a capacitor array to cause a current to flow in a certain direction while another potential is applied to the other capacitors to cause a current to flow in the opposite direction so that magnetic fields generated by currents flowing through two capacitors are canceled to reduce the ESL.

However, the monolithic ceramic capacitor disclosed in Japanese Unexamined Patent Application Publication No. 2003-318066 has the following problems.

First, in a monolithic ceramic capacitor which is mounted on a wiring substrate via solder joints, due to a defect, such as cracking of a solder joint, a disconnection may occur between a certain external terminal electrode and a conductive land. In this case, it may be difficult to obtain a capacitance corresponding to an array associated with the external terminal electrode in which the disconnection has occurred. The capacitance may therefore be significantly reduced. Even if only one solder joint is cracked, the capacitance corresponding to the "inverse of the number of arrays" is decreased.

Another problem is that it is time-consuming to measure the overall capacitance of the monolithic ceramic capacitor. The overall capacitance of the monolithic ceramic capacitor is substantially equal to the sum total of the capacitances of the individual capacitance arrays. Thus, the overall capacitance is determined by measuring the capacitance of each of the capacitor arrays and summing the capacitances, or by measuring the capacitance in a state in which all external terminal electrodes are connected to a wiring substrate or any other substrate.

SUMMARY OF THE INVENTION

To overcome the problems described above, preferred embodiments of the present invention provide a monolithic ceramic capacitor which includes a capacitor body including a plurality of laminated ceramic layers and having a first principal surface, a second principal surface facing the first principal surface, and a side surface connecting the first principal surface and the second principal surface.

A plurality of first external terminal electrodes, each of which is connected to a first potential, and a plurality of second external terminal electrodes, each of which is connected to a second potential, are provided on the side surface of the capacitor body.

A first internal electrode electrically connected to at least one of the first external terminal electrodes, a second internal electrode electrically connected to at least one of the second external terminal electrodes, a third internal electrode electrically connected to at least one of the first external terminal electrodes, and a fourth internal electrode electrically connected to at least one of the second external terminal electrodes are provided inside the capacitor body.

At least one first capacitor having a capacitance that is provided by arranging the first internal electrode and the second internal electrode with a specific one of the ceramic layers therebetween are provided inside the capacitor body. At least one second capacitor having a capacitance that is provided by arranging the third internal electrode and the fourth internal electrode with a specific one of the ceramic layers therebetween are further provided inside the capacitor body so as to be arranged adjacent to the first capacitors in a plan view of the ceramic layers.

The monolithic ceramic capacitor preferably further includes a first same-polarity-connection conductor provided inside the capacitor body, the first same-polarity-connection conductor extending over at least two capacitors selected from the first capacitor and the second capacitor and being electrically connected to at least two of the plurality of first external terminal electrodes.

Preferably, the monolithic ceramic capacitor is connected to an external circuit to cause a current to flow through the internal electrodes so that directions of currents flowing through at least opposing portions of adjacent internal electrodes that are located on an identical ceramic layer are opposite to one another.

The first internal electrode may be electrically connected to one of the first external terminal electrodes, the second internal electrode may be electrically connected to one of the second external terminal electrodes, the third internal electrode may be electrically connected to one of the first external terminal electrodes, and the fourth internal electrode may be electrically connected to one of the second external terminal electrodes. Alternatively, the first internal electrode may be electrically connected to a plurality of the first external terminal electrodes, the second internal electrode may be electrically connected to a plurality of the second external terminal electrodes, the third internal electrode may be electrically connected to a plurality of the first external terminal electrodes, and the fourth internal electrode may be electrically connected to a plurality of the second external terminal electrodes.

Furthermore, preferably, the first same-polarity-connection conductor is electrically connected to all of the first external terminal electrodes.

When the side surface includes a first side surface and a second side surface facing the first side surface and when the first external terminal electrodes include a first external terminal electrode provided on the first side surface and a first external terminal electrode provided on the second side surface, the first same-polarity-connection conductor may include a same-polarity-connection conductor electrically connected to only the first external terminal electrode provided on the first side surface, and a same-polarity-connection conductor electrically connected to only the first external terminal electrode provided on the second side surface. Alternatively, the first same-polarity-connection conductor may include a same-polarity-connection conductor electrically connected to the first external terminal electrode provided on the first side surface and to the first external terminal electrode provided on the second side surface.

Furthermore, a single first same-polarity-connection conductor may be provided inside the capacitor body, or a plurality of first same-polarity-connection conductors may be provided inside the capacitor body. In the latter case, preferably, the plurality of first same-polarity-connection conductors are successively arranged in a lamination direction of the capacitor body in which the ceramic layers are laminated.

Preferably, the first same-polarity-connection conductor includes a main portion having a relatively large area, and a plurality of leading portions that extend from the main portion and that are electrically connected to the plurality of first external terminal electrodes.

In another preferred embodiment of the present invention, the first same-polarity-connection conductor may have a line shape having a predetermined width. In this case, preferably, when viewed from a specific interface between the ceramic layers, an area occupied by an exposed portion of the ceramic layers is greater than an area occupied by the first same-polarity-connection conductor.

Furthermore, preferably, the monolithic ceramic capacitor further includes a first dummy internal conductor provided on an interface between the ceramic layers on which the first same-polarity-connection conductor is provided, the first dummy internal conductor being connected to or disposed close to the second external terminal electrode but not being connected to the first same-polarity-connection conductor.

Furthermore, the first same-polarity-connection conductor may include a same-polarity-connection conductor arranged so as to face the first internal electrode and the third internal electrode through the ceramic layer. Alternatively, the first same-polarity-connection conductor may include a same-polarity-connection conductor that is disposed close to at least one of the first principal surface and the second principal surface and that is arranged so as to face the second internal electrode and/or the fourth internal electrode through the ceramic layer.

Furthermore, preferably, a buffer area in which none of the first, second, third, and fourth internal electrodes is disposed is provided in an area including the approximate center in the lamination direction of the capacitor body. In this case, more preferably, the first same-polarity-connection conductor is arranged in this buffer area.

Preferably, the monolithic ceramic capacitor further includes a second same-polarity-connection conductor provided inside the capacitor body, the second same-polarity-connection conductor extending over at least two capacitors selected from the first capacitor and the second capacitor and being electrically connected to at least two of the plurality of second external terminal electrodes. The second same-polarity-connection conductor can also be provided in a similar manner to that of the first same-polarity-connection conductor described above, which will be described below.

First, preferably, the second same-polarity-connection conductor is electrically connected to all of the second external terminal electrodes.

When the side surface includes a first side surface and a second side surface facing the first side surface and when the second external terminal electrodes include a second external terminal electrode provided on the first side surface and a second external terminal electrode provided on the second side surface, the second same-polarity-connection conductor may include a same-polarity-connection conductor electrically connected only to the second external terminal electrode provided on the first side surface, and a same-polarity-connection conductor electrically connected only to the second external terminal electrode provided on the second side surface. Alternatively, the second same-polarity-connection conductor may include a same-polarity-connection conductor electrically connected to the second external terminal electrode provided on the first side surface and to the second external terminal electrode provided on the second side surface.

Furthermore, a single second same-polarity-connection may be provided inside the capacitor body, or a plurality of second same-polarity-connection conductors may be provided inside the capacitor body. In the latter case, preferably, the plurality of second same-polarity-connection conductors are successively arranged in the lamination direction of the capacitor body.

Preferably, the second same-polarity-connection conductor includes a main portion having a relatively large area, and a plurality of leading portions that extend from the main portion and that are electrically connected to the plurality of second external terminal electrodes.

In another preferred embodiment, the second same-polarity-connection conductor may have a line shape having a predetermined width. In this case, preferably, when viewed from a specific interface between the ceramic layers, an area occupied by an exposed portion of the ceramic layers is greater than an area occupied by the second same-polarity-connection conductor.

Furthermore, preferably, the monolithic ceramic capacitor further includes a second dummy internal conductor provided on an interface between the ceramic layers on which the second same-polarity-connection conductor is provided, the second dummy internal conductor being connected to or arranged close to the first external terminal electrodes but not being connected to the second same-polarity-connection conductor.

Furthermore, the second same-polarity-connection conductor may include a same-polarity-connection conductor arranged so as to face the second internal electrode and the fourth internal electrode through the ceramic layer. Alternatively, the second same-polarity-connection conductor may include a same-polarity-connection conductor that is disposed close to at least one of the first principal surface and the second principal surface and that is arranged so as to face the first internal electrode and/or the third internal electrode through the ceramic layer.

Furthermore, when a buffer area in which none of the first, second, third, and fourth internal electrodes is provided is provided in an area including the approximate center in the lamination direction of the capacitor body, the second same-polarity-connection conductor is preferably arranged in the buffer area.

When the first and second same-polarity-connection conductors are provided, preferably, the first same-polarity-connection conductor includes a same-polarity-connection conductor that is arranged so as to face the first internal electrode and the third internal electrode through the ceramic layer and that is arranged so as to face the second same-polarity-connection conductor, on a side opposite to a side on which the first internal electrode and the third internal electrode are located, through the ceramic layer.

According to preferred embodiments of the present invention, the first same-polarity-connection conductor may be used to electrically connect at least two of the plurality of first external terminal electrodes. When conductive lands on a wiring substrate and the external terminal electrodes are electrically connected via solder joints, an accident or damage such as cracking of a solder joint may occur in any of the first external terminal electrodes and may cause a disconnection between a specific one of the first external terminal electrodes and a corresponding conductive land. However, the capacitance provided by the monolithic ceramic capacitor can be maintained at a desired value as long as the first external terminal electrode in which the disconnection has occurred is electrically connected to another first external terminal electrode via the same-polarity-connection conductor.

Furthermore, the overall capacitance of the monolithic ceramic capacitor can be measured using only one of the at least two first external terminal electrodes connected through the same-polarity-connection conductor. It is not necessary to measure the overall capacitance using all of the first external terminal electrodes. Therefore, the overall capacitance of the monolithic ceramic capacitor can be easily determined.

In preferred embodiments of the present invention, the first same-polarity-connection conductor may be electrically connected to all of the first external terminal electrodes.

Therefore, even if an accident or damage such as cracking of a solder joint occurs in any of the first external terminal electrodes, a desired capacitance can be maintained in the monolithic ceramic capacitor.

Furthermore, a single first same-polarity-connection conductor may be provided inside the capacitor body, whereby, advantageously, the height of the monolithic ceramic capacitor can be reduced.

Alternatively, a plurality of first same-polarity-connection conductors may be provided inside the capacitor body. In this case, the plurality of first same-polarity-connection conductors are laminated in the lamination direction, whereby the connection reliability between the first same-polarity-connection conductors and the first external terminal electrodes can be improved. This ensures more reliable backup when a disconnection occurs.

Furthermore, the first same-polarity-connection conductor may include a main portion having a relatively large area, and a plurality of leading portions that extend from the main portion and that are electrically connected to the plurality of first external terminal electrodes. Because of the presence of the main portion having a relatively large area, a current path can be easily provided and backup when a disconnection occurs can be more reliably provided. This structure is effective to reduce the number of first same-polarity-connection conductors.

The first same-polarity-connection conductor may have a line shape having a predetermined width, whereby, as viewed from a specific interface between the ceramic layers, the area occupied by an exposed portion of the ceramic layers can be easily increased as compared to the area occupied by the first same-polarity-connection conductor. As a result, the bonding strength between the ceramic layers can be increased.

A first dummy internal conductor connected to or disposed close to the second external terminal electrodes may be provided on an interface between the ceramic layers on which the first same-polarity-connection conductor is provided. The first dummy internal conductor can reduce the influence of dents and steps that may be caused by the presence of leading portions extending from the first same-polarity-connection conductor and connected to the first external terminal electrodes.

The first same-polarity-connection conductor may be arranged so as to face the first and third internal electrodes through the ceramic layer. In this case, the first same-polarity-connection conductor does not substantially contribute to the formation of a capacitance. Thus, the variations in capacitance, which are caused by the presence of the first same-polarity-connection conductor, can be substantially eliminated.

Alternatively, the first same-polarity-connection conductor may be disposed close to at least one of the first and second principal surfaces and may be arranged so as to face the second internal electrode and/or the fourth internal electrode through the ceramic layer. In this case, a capacitance is provided by arranging the first same-polarity-connection conductor and the second internal electrode and/or the fourth internal electrode so as to face each other. Since the first same-polarity-connection conductor includes at least two leading portions, a large current distribution is obtained. This first same-polarity-connection conductor is disposed near a mounted surface, whereby a loop inductance can be reduced and ESL can therefore be reduced.

A buffer area in which none of the first, second, third, and fourth internal electrodes is disposed may be provided in an area including the approximate center in the lamination direction of the capacitor body, and the first same-polarity-connection conductor may be arranged in this buffer area, thereby achieving the following advantageous effects. If the ceramic layers are formed of a dielectric made of a high-dielectric-constant material, the capacitor body expands and contracts due to the electrostriction effect of the dielectric. The stress caused by the expansion and contraction might produce cracks in the capacitor body. The buffer area described above reduces the stress that might cause such cracks. The buffer area in which no internal electrodes are provided has low bending strength. Thus, as descried above, the first same-polarity-connection conductor is provided in the buffer area, whereby the first same-polarity-connection conductor also improves the strength of the capacitor body.

In preferred embodiments of the present invention, the monolithic ceramic capacitor may further include a second same-polarity-connection conductor. In this case, the second same-polarity-connection conductor achieves advantageous effects that are substantially similar to those achieved by the first same-polarity-connection conductor described above.

In this case, the first same-polarity-connection conductor may include a same-polarity-connection conductor that is arranged so as to face the first and third internal electrodes through the ceramic layer and that is arranged so as to face the second same-polarity-connection conductor, on a side opposite to a side on which the first and third internal electrodes are located, through the ceramic layer. Thus, no capacitance is generated between the same-polarity-connection conductors and the internal electrodes while a capacitance is generated between the first and second same-polarity-connection conductors. By adjusting the capacitance generated between the first and second same-polarity-connection conductors, the overall capacitance of the monolithic ceramic capacitor can be finely adjusted.

In preferred embodiments of the present invention, a current may flow through the internal electrodes so that directions of currents flowing through at least opposing portions of adjacent internal electrodes are opposite to one another. In this case, magnetic fields generated between the adjacent internal electrodes are canceled. Therefore, the ESL can be effectively reduced.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 8A to 8D are diagrams of a monolithic ceramic capacitor according to a fifth preferred embodiment of the present invention, corresponding to FIGS. 3A to 3D.

FIGS. 10A and 10B are diagrams of a monolithic ceramic capacitor according to a seventh preferred embodiment of the present invention, corresponding to FIGS. 9A and 9D.

FIGS. 12A to 12F are diagrams of a monolithic ceramic capacitor according to a ninth preferred embodiment of the present invention, corresponding to FIGS. 3A to 3D.

FIGS. 13A to 13H are diagrams of a monolithic ceramic capacitor according to a tenth preferred embodiment of the present invention, corresponding to FIGS. 3A to 3D.

DETAILED DESCRIPTION OF THE PREFERRED EMBODIMENTS

Figure 1:
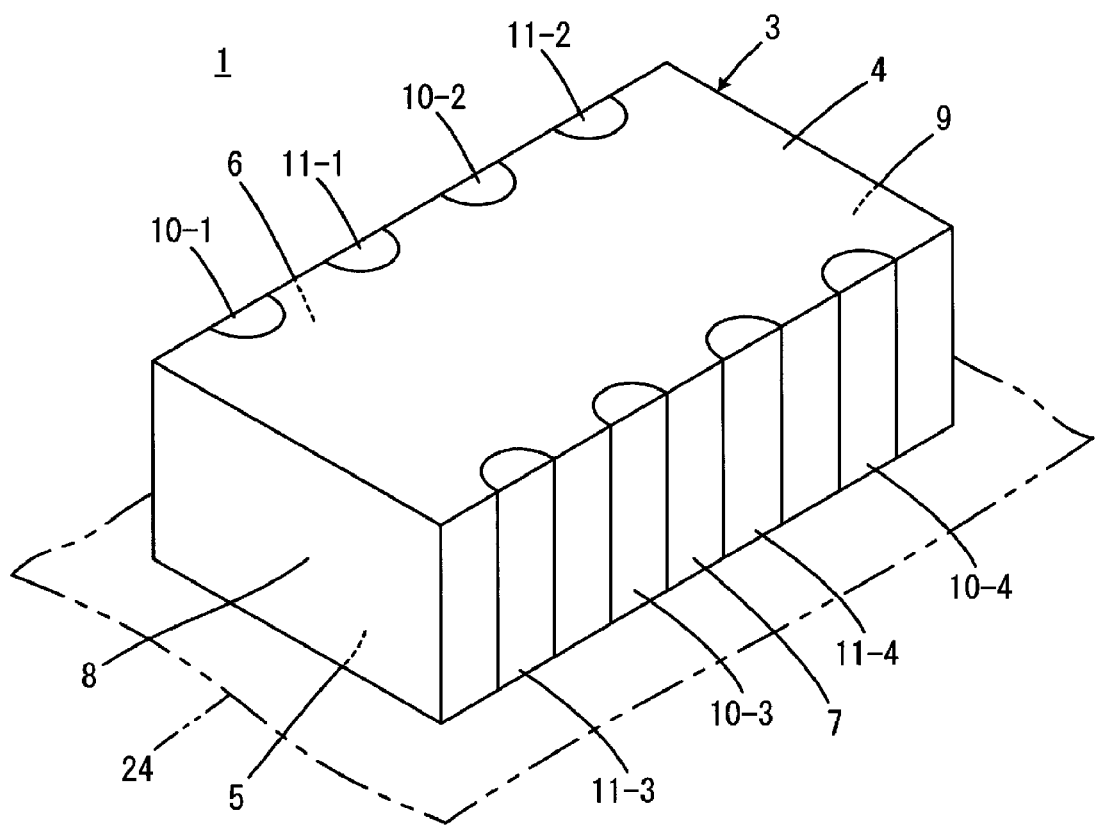
FIG. 1 is a perspective view showing an external appearance of a monolithic ceramic capacitor according to a first preferred embodiment of the present invention.
Figure 2:
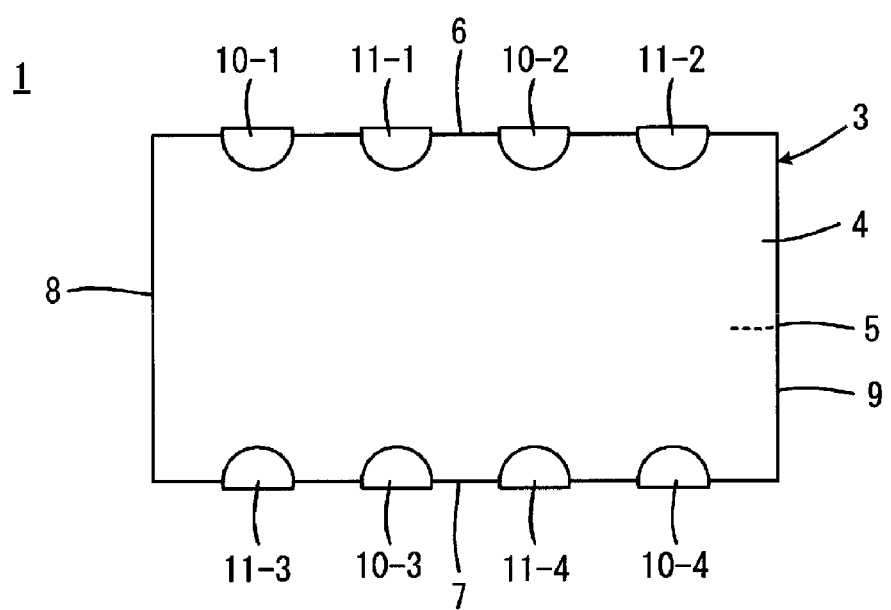
FIG. 2 is a plan view showing the external appearance of the monolithic ceramic capacitor shown in FIG. 1.
Figure 3A:
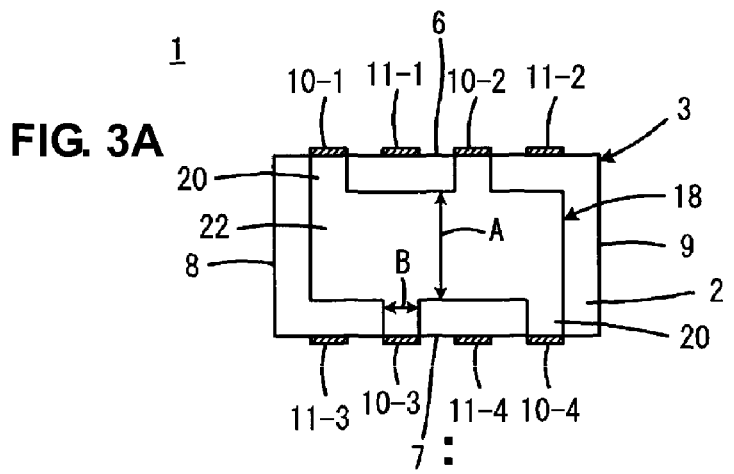
FIGS. 3A to 3D are plan views showing an internal structure of the monolithic ceramic capacitor shown in FIG. 1 in cross section.
Figure 3B:
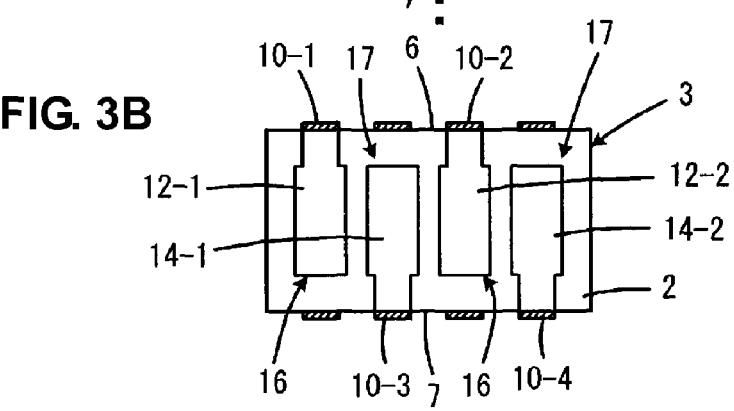
Figure 3C:
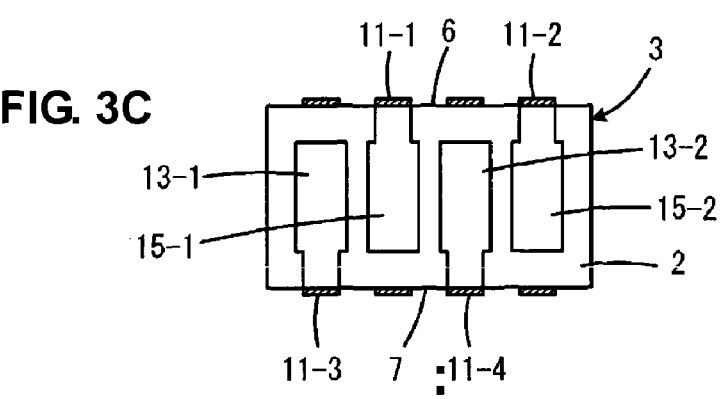
Figure 3D:
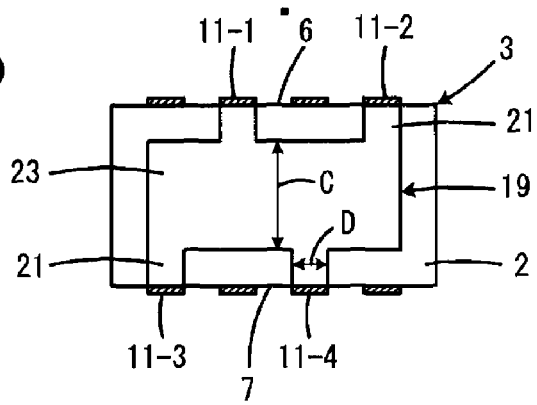
Figure 4:
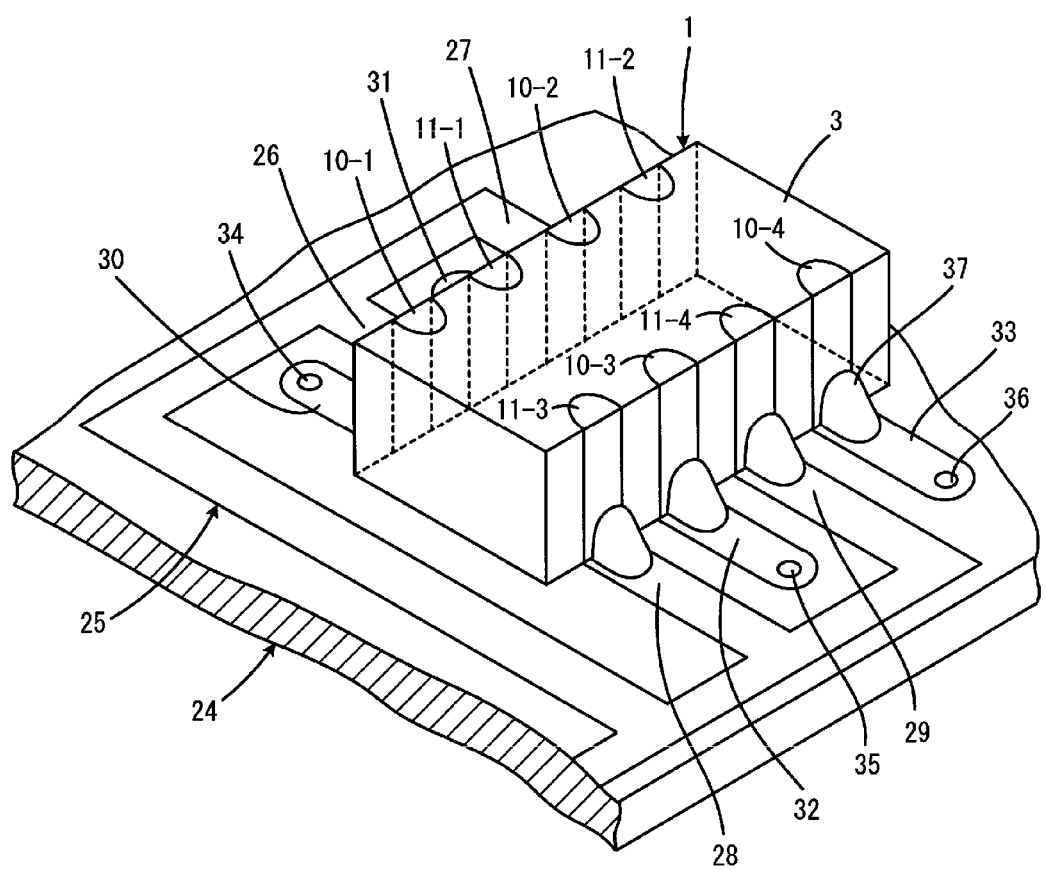
FIG. 4 is a perspective view showing how the monolithic ceramic capacitor shown in FIG. 1 is mounted.

FIGS. 1 to 4 show a monolithic ceramic capacitor 1 according to a first preferred embodiment of the present invention. FIG. 1 is a perspective view showing an external appearance of the monolithic ceramic capacitor 1, and FIG. 2 is a plan view showing the external appearance of the monolithic ceramic capacitor 1. FIGS. 3A to 3D are plan views showing an internal structure of the monolithic ceramic capacitor 1 in cross section, showing a lamination order from the top layer. FIG. 4 is a perspective view showing how the monolithic ceramic capacitor 1 shown in FIG. 1 is mounted.

The monolithic ceramic capacitor 1 preferably includes a substantially rectangular parallelepiped capacitor body 3 having a plurality of laminated ceramic layers 2. Each of the ceramic layers 2 is preferably made of, for example, a dielectric ceramic including, as a main component, $BaTiO_3$, $CaTiO_3$, $SrTiO_3$, $CaZrO_3$, or other suitable main component. An auxiliary component, such as a Mn compound, an Fe compound, a Cr compound, a Co compound, or a Ni compound, may be added to the main component, for example. Each of the ceramic layers 2 preferably has a thickness of, for example, about 2.0 µm to about 3.0 µm, for example.

The capacitor body 3 has a first principal surface 4 and a second principal surface 5 facing the first principal surface 4. The capacitor body 3 further has a first side surface 6, a second side surface 7, a third side surface 8, and a fourth side surface 9 that connect the first and second principal surfaces 4 and 5. Each of the ceramic layers 2 extends in the direction of the principal surfaces 4 and 5. The side surfaces 6 to 9 extend in a lamination direction in which the ceramic layers 2 are laminated. The first and second side surfaces 6 and 7 face each other, and the third and fourth side surfaces 8 and 9 face each other. The first and second side surfaces 6 and 7 are located so as to extend along the longer sides of the ceramic layers 2.

A plurality of first external terminal electrodes 10 and a plurality of second external terminal electrodes 11 are provided on a side surface of the capacitor body 3. In this preferred embodiment, four first external terminal electrodes 10 and four second external terminal electrodes 11 are provided on the first and second side surfaces 6 and 7. Each of the first external terminal electrodes 10 is connected to a first potential, and each of the second external terminal electrodes 11 is connected to a second potential. Preferably, the first external terminal electrodes 10 and the second external terminal electrodes 11 are alternately arranged adjacent to each other.

In the following description, the four first external terminal electrodes 10 are referred to as first external terminal electrodes 10-1, 10-2, 10-3, and 10-4 to distinguish them from each other, and the four second external terminal electrodes 11 are referred to as second external terminal electrodes 11-1, 11-2, 11-3, and 11-4 to distinguish them from each other.

Examples of a conductive component of the external terminal electrodes 10 and 11 may include, but are not limited to, Cu, Ni, Ag, Pd, Ag—Pd alloy, and Au. When the monolithic ceramic capacitor 1 is mounted using a solder joint, the external terminal electrodes 10 and 11 preferably have a structure in which a Ni plating layer is formed on a metal underlayer and a Sn plating layer is formed on the Ni plating layer in that order. When the monolithic ceramic capacitor 1 is mounted so as to be embedded in a resin substrate, the external terminal electrodes 10 and 11 preferably have a structure in which a Cu plating layer having high adhesion to resin is formed on a metal underlayer. When the monolithic ceramic capacitor 1 is mounted using a conductive adhesive, the external terminal electrodes 10 and 11 preferably include Ag, Pd, or Ag—Pd alloy as a conductive component. When the monolithic ceramic capacitor 1 is mounted by wire bonding, the external terminal electrodes 10 and 11 preferably include Au as a conductive component.

As shown in FIGS. 3B and 3C, a plurality of first internal electrodes 12, a plurality of second internal electrodes 13, a plurality of third internal electrodes 14, and a plurality of fourth internal electrodes 15 are provided inside the capacitor body 3. Examples of a conductive component included in the internal electrodes 12 to 15 may include, but are not limited to, Ni, Cu, Ag, Pd, Ag—Pd alloy, and Au. Each of the internal electrodes 12 to 15 preferably has a thickness of about 0.8 μm to about 1.2 μm, for example.

The first internal electrodes 12 and the second internal electrodes 13 define first capacitors 16, and face each other through a corresponding one of the ceramic layers 2 so as to provide a capacitance between the first internal electrodes 12 and the second internal electrodes 13. The third internal electrodes 14 and the fourth internal electrodes 15 define second capacitors 17, and face each other through the corresponding one of the ceramic layers 2 so as to provide a capacitance between the third internal electrodes 14 and the fourth internal electrodes 15. The second capacitors 17 are arranged adjacent to the first capacitors 16 in a plan view of the ceramic layers 2.

In this preferred embodiment, as shown in FIGS. 3B and 3C, two first internal electrodes 12, two second internal electrodes 13, two third internal electrodes 14, and two fourth internal electrodes 15 are disposed at specific interfaces between the ceramic layers 2. In the following description, the two first internal electrodes 12 are referred to as first internal electrodes 12-1 and 12-2 to distinguish them from each other; the two second internal electrodes 13 are referred to as second internal electrodes 13-1 and 13-2 to distinguish them from each other; the two third internal electrodes 14 are referred to as third internal electrodes 14-1 and 14-2 to distinguish them from each other; and the two fourth internal electrodes 15 are referred to as fourth internal electrodes 15-1 and 15-2 to distinguish them from each other.

In this preferred embodiment, two first capacitors 16 and two second capacitors 17, that is, a total of four capacitors 16 and 17, for example, are preferably provided. Each of the internal electrodes 12 to 15 includes one leading portion, which is connected to a corresponding one of the external terminal electrodes 10 or a corresponding one of the external terminal electrodes 11. The leading portions of the internal electrodes 12 to 15 are arranged so that leading portions extending to the side surface 6 and leading portions extending to the side surface 7, which face each other, are alternately arranged and are electrically connected to the corresponding ones of the external terminal electrodes 10 or 11.

More specifically, as shown in FIG. 3B, the first internal electrodes 12-1 and 12-2 are electrically connected to the first external terminal electrodes 10-1 and 10-2, respectively. As shown in FIG. 3C, the second internal electrodes 13-1 and 13-2 are electrically connected to the second external terminal electrodes 11-3 and 11-4, respectively. As shown in FIG. 3B, the third internal electrodes 14-1 and 14-2 are electrically connected to the first external terminal electrodes 10-3 and 10-4, respectively. As shown in FIG. 3C, the fourth internal electrodes 15-1 and 15-2 are electrically connected to the second external terminal electrodes 11-1 and 11-2, respectively.

As can be understood from the above-described connection between the internal electrodes 12 to 15 and the external terminal electrodes 10 and 11, the first internal electrodes 12 and the third internal electrodes 14, which are located at the interface between the ceramic layers 2, are commonly electrically connected to the first external terminal electrodes 10, and the second internal electrodes 13 and the fourth internal electrodes 15, which are located at the same interface between the ceramic layers 2, are commonly electrically connected to the second external terminal electrodes 11.

A first same-polarity-connection conductor 18 and a second same-polarity-connection conductor 19 are further provided inside the capacitor body 3 as shown in FIGS. 3A and 3D, respectively. The first and second same-polarity-connection conductors 18 and 19 are preferably made of the same material as that of the internal electrodes 12 to 15 described above. Each of the same-polarity-connection conductors 18 and 19 preferably has a thickness of, for example, about 0.8 μm to about 1.2 μm, which is similar to that of the internal electrodes 12 to 15.

As shown in FIG. 3A, the first same-polarity-connection conductor 18 includes a main portion 22 having a relatively large area, and four leading portions 20 extending from the main portion 22 and having relatively small areas. In this preferred embodiment, in particular, the main portion 22 has a width A that is greater than a width B of each of the leading portions 20. The four leading portions 20 are electrically connected to the four first external terminal electrodes 10, and thus, the first same-polarity-connection conductor 18 is electrically connected to all of the first external terminal electrodes 10.

As shown in FIG. 3D, the second same-polarity-connection conductor 19 includes a main portion 23 having a relatively large area, and four leading portions 21 extending from the main portion 23 and having relatively small areas. In this preferred embodiment, in particular, the main portion 23 has a width C that is greater than a width D of each of the leading portions 21. The four leading portions 21 are electrically connected to the four second external terminal electrodes 11, and thus, the second same-polarity-connection conductor 19 is electrically connected to all of the second external terminal electrodes 11.

In this preferred embodiment, a single first same-polarity-connection conductor 18 and a single second same-polarity-connection conductor 19 are provided inside the capacitor body 3.

In the capacitor body 3, as described above, the ceramic layers 2 are laminated in the lamination order shown in FIGS. 3A to 3D. Accordingly, the first and second same-polarity-connection conductor 18 and 19 are arranged so as to sandwich the capacitors 16 and 17 therebetween. Although not shown in the figures, a predetermined number of ceramic layers 2 having no internal electrodes or same-polarity-connection conductors are laminated on either end in the lamination direction of the capacitor body 3. In the lamination structure of the capacitor body 3, laminate sections shown in FIGS. 3B and 3C are repeatedly laminated a predetermined number of times as required.

In this preferred embodiment, the first same-polarity-connection conductor 18 is arranged so as to face the first and third internal electrodes 12 and 14 through the ceramic layer 2. However, no capacitance is generated between the first same-polarity-connection conductor 18 and the first and third internal electrodes 12 and 14, and an increase in capacitance due to the arrangement of the first same-polarity-connection conductor 18 is prevented or reduced. The second same-polarity-connection conductor 19 is also arranged so as to face the second and fourth internal electrodes 13 and 15 through the ceramic layer 2. However, no capacitance is generated between the second same-polarity-connection conductor 19 and the second and fourth internal electrodes 13 and 15, and an increase in capacitance due to the arrangement of the second same-polarity-connection conductor 19 is prevented or reduced.

Moreover, in this preferred embodiment, as shown in FIGS. 3A to 3D, the external terminal electrodes 10 and 11 are connected to an external circuit to cause currents to flow through the internal electrodes 12 to 15 so that directions of currents flowing through adjacent internal electrodes that are located on the same ceramic layer 2 are opposite to one another. Thus, magnetic fields generated by the currents flowing through the internal electrodes 12 to 15 are canceled, and therefore, the ESL is reduced.

FIG. 1 shows a wiring substrate 24 as indicated by an imaginary line. The monolithic ceramic capacitor 1 is surface-mounted on the wiring substrate 24 so that, for example, the second principal surface 5 of the capacitor body 3 is in contact with the wiring substrate 24. A specific example of the monolithic ceramic capacitor 1 mounted in this manner will now be described with reference to FIG. 4.

The wiring substrate 24 includes a conductor line 25 provided thereon, and the conductor line 25 defines conductive lands 26 to 29. The wiring substrate 24 also includes conductive lands 30 to 33 provided thereon. Each of the conductive lands 30 to 33 is electrically connected to a circuit (not shown) provided inside the wiring substrate 24 through a via conductor. FIG. 4 shows via conductors 34, 35, and 36 that are electrically connected to the conductive lands 30, 32, and 33, respectively.

When the monolithic ceramic capacitor 1 is mounted on the wiring substrate 24, the first external terminal electrodes 10-1, 10-2, 10-3, and 10-4 are connected and fixed to the conductive lands 30, 31, 32, and 33, respectively, via solder joints 37. The second external terminal electrodes 11-1, 11-2, 11-3, and 11-4 are connected and fixed to the conductive lands 26, 27, 28, and 29, respectively, via solder joints 37.

Accordingly, all of the first external terminal electrodes 10-1, 10-2, 10-3, and 10-4 and all of the second external terminal electrodes 11-1, 11-2, 11-3, and 11-4 are connected to the corresponding ones of the conductive lands 26 to 33. In this case, the conductive lands 26 to 29 commonly defined by the conductor line 25 have the same potential, and the conductive lands 30 to 33 have another potential different from the potential of the conductive lands 26 to 29. Thus, the potential connected to the first external terminal electrodes 10 and the potential connected to the second external terminal electrodes 11 are different from each other.

In the monolithic ceramic capacitor 1 of the first preferred embodiment described above, all of the first external terminal electrodes 10 are electrically connected via the first same-polarity-connection conductor 18, and all of the second external terminal electrodes 11 are electrically connected via the second same-polarity-connection conductor 19. When the monolithic ceramic capacitor 1 is surface-mounted on the wiring substrate 24 so that the conductive lands 26 to 33 on the wiring substrate 24 are electrically connected to the corresponding ones of the external terminal electrodes 10 and 11 via the solder joints 37, a disconnection may occur between a specific one of the external terminal electrodes 10 and 11 and a corresponding conductive land due to an accident, such as cracking of a solder joint. However, even if an accident or damage occurs, a desired capacitance can be maintained in the monolithic ceramic capacitor 1.

Furthermore, in the first preferred embodiment, the first same-polarity-connection conductor 18 includes the main portion 22 having a relatively large area and the plurality of leading portions 20 extending from the main portion 22 and having relatively small areas, and the second same-polarity-connection conductor 19 includes the main portion 23 having a relatively large area and the plurality of leading portions 21 extending from the main portion 23 and having relatively small areas. Because of the presence of the main portions 22 and 23 having a relatively large area, a current path can be easily provided and backup when a disconnection described above occurs can be more reliably provided. The structure to achieve such advantageous effects may be used in only the first same-polarity-connection conductor 18.

Furthermore, the overall capacitance of the monolithic ceramic capacitor 1 can be measured using any of the first external terminal electrodes 10 and any of the second external terminal electrodes 11. Therefore, the overall capacitance can be easily determined.

According to this preferred embodiment, all of the first external terminal electrodes 10 can be electrically connected to each other using only one first same-polarity-connection conductor 18, whereby, advantageously, the height of the monolithic ceramic capacitor 1 can be reduced. If such an advantage is not required, a plurality of first same-polarity-connection conductors 18 may be provided at different interfaces between the ceramic layers 2. This also applies to the second same-polarity-connection conductor 19.

An example of a method of manufacturing the monolithic ceramic capacitor 1 described above will now be described.

First, ceramic green sheets, which are used as the ceramic layers 2, a conductive paste used for the internal electrodes 12 to 15, a conductive paste used for the external terminal electrodes 10 and 11, and a conductive paste used for the same-polarity-connection conductors 18 and 19 are prepared. In the illustrated example, as the conductive paste used for the same-polarity-connection conductors 18 and 19, the same conductive paste as that used for the internal electrodes 12 to 15 is used. The ceramic green sheets and the conductive pastes may be existing ceramic green sheets and conductive pastes, for example.

Then, the conductive pastes are printed on the ceramic green sheets using, for example, screen-printing so as to have a predetermined pattern. Thus, ceramic green sheets having thereon conductive paste films formed thereon that individually correspond to the internal electrodes 12 to 15 and the same-polarity-connection conductors 18 and 19 are obtained.

The ceramic green sheets having the conductive paste films formed thereon in the manner described above are laminated in a predetermined order. A predetermined number of outer-layer ceramic green sheets having no conductive paste films formed thereon are laminated on each of the top and bottom surfaces of the resulting laminate. Thus, an unfired mother laminate is obtained. The unfired mother laminate is compressed in the lamination direction as required using a method, such as isostatic pressing.

The unfired mother laminate is then cut so as to have a predetermined size. Accordingly, the capacitor body 3, which is unfired, is obtained.

The unfired capacitor body 3 is then fired. The firing temperature is selected from the range of, for example, about 900° C. to about 1300° C., although it depends on the ceramic material included in the ceramic green sheets or the metal material included in the electrically conductive paste films.

Then, a conductive paste is printed on the first and second side surfaces 6 and 7 of the sintered capacitor body 3 using screen-printing or any other suitable method so as to have a predetermined pattern, and conductive paste films for the external terminal electrodes 10 and 11 are formed. The conductive paste films are preferably formed so as to extend from the side surfaces 6 and 7 to portions of the principal surfaces 4 and 5.

The conductive past films are then baked to thereby form the external terminal electrodes 10 and 11. The baking temperature is selected from the range of, for example, about 700° C. to about 900° C. An atmosphere, such as air, $N_2$, or water vapor+$N_2$, is appropriately selected as the atmosphere during baking in accordance with the type of metal included in the conductive paste.

Thus, the manufacturing of the monolithic ceramic capacitor 1 is completed. A plating film may be formed on the surfaces of the external terminal electrodes 10 and 11 as require.

Other preferred embodiments of the present invention will now be described. Each of monolithic ceramic capacitors according to the other preferred embodiments, which will be described with reference to the drawings, includes an external appearance that is similar to the monolithic ceramic capacitor 1 according to the first preferred embodiment described above, and includes an external appearance that is similar to that shown in FIGS. 1 and 2.

Figure 5A:
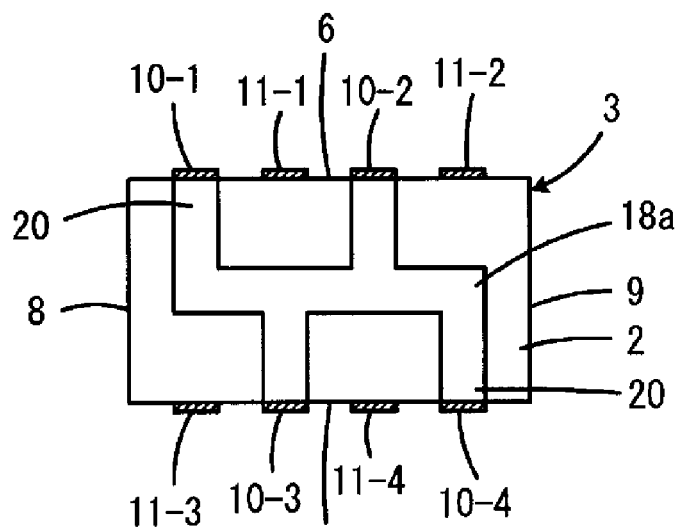
FIGS. 5A and 5B are diagrams of a monolithic ceramic capacitor according to a second preferred embodiment of the present invention, corresponding to FIGS. 3A and 3D.
Figure 5B:
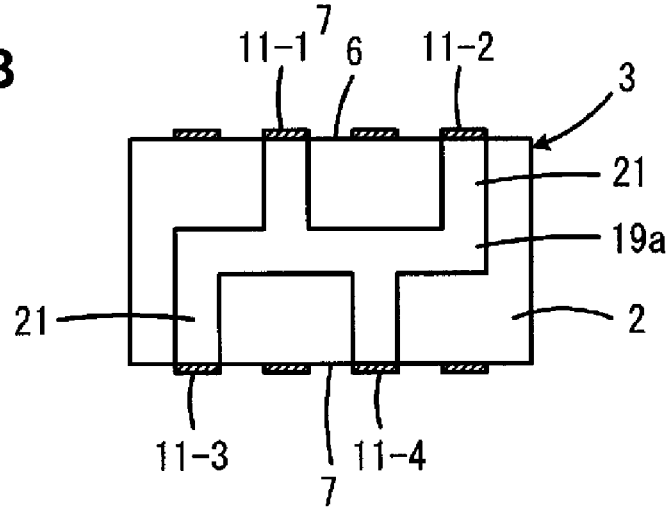

FIGS. 5A and 5B show a monolithic ceramic capacitor according to a second preferred embodiment of the present invention. In the second preferred embodiment, a modification of the same-polarity-connection conductors 18 and 19 according to the first preferred embodiment is provided. FIGS. 5A and 5B correspond to FIGS. 3A and 3D. In FIGS. 5A and 5B, elements corresponding to those shown in FIGS. 3A and 3D are assigned the same reference numerals, and will not be described herein.

As shown in FIGS. 5A and 5B, in the second preferred embodiment, each of a first same-polarity-connection conductor 18*a* and a second same-polarity-connection conductor 19*a* has a line shape with a predetermined width. Thus, as viewed from a specific interface between the ceramic layers 2, the area occupied by an exposed portion of the ceramic layers 2 can be easily increased as compared to the area occupied by each of the first and second same-polarity-connection conductors 18*a* and 19*a*. Therefore, according to the second preferred embodiment, the bonding strength between the ceramic layers 2 is increased.

Figure 6A:
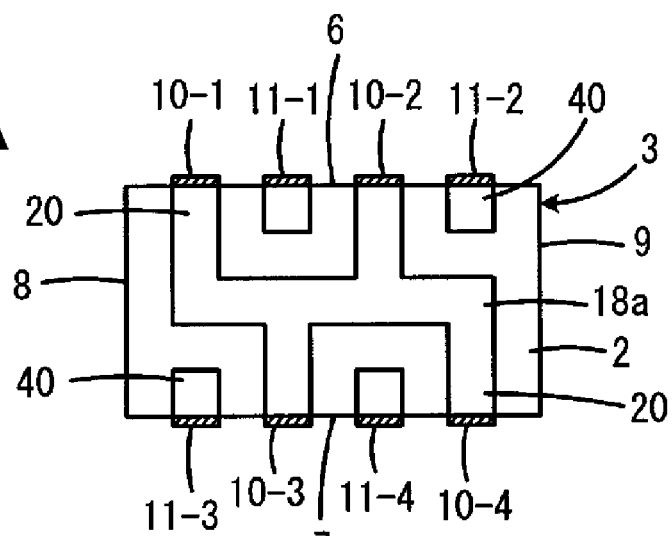
FIGS. 6A and 6B are diagrams of a monolithic ceramic capacitor according to a third preferred embodiment of the present invention, corresponding to FIGS. 3A and 3D.
Figure 6B:
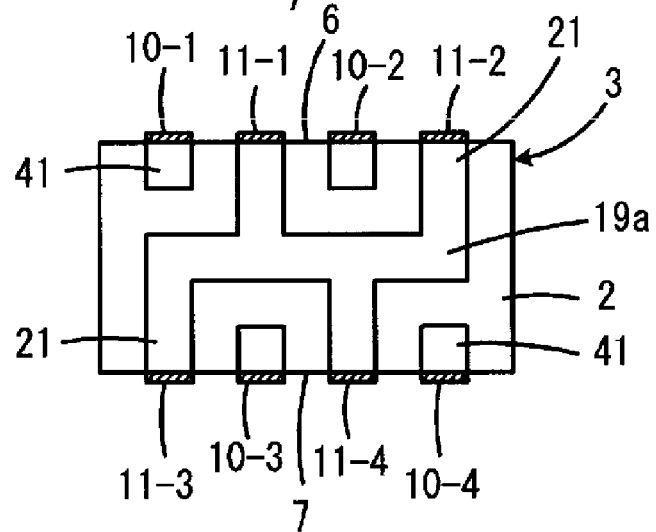

FIGS. 6A and 6B show a monolithic ceramic capacitor according to a third preferred embodiment of the present invention. FIGS. 6A and 6B correspond to FIGS. 3A and 3D. In FIGS. 6A and 6B, elements corresponding to those shown in FIGS. 3A and 3D are assigned the same reference numerals, and will not be described herein.

In the third preferred embodiment, a first same-polarity-connection conductor 18*a* and a second same-polarity-connection conductor 19*a*, each having a similar shape to that of the second preferred embodiment described above, are provided. In the third preferred embodiment, as shown in FIG. 6A, first dummy internal conductors 40 are provided at an interface between the ceramic layers 2 on which the first same-polarity-connection conductor 18*a* is provided. The first dummy internal conductors 40 are not connected to the first same-polarity-connection conductor 18*a* but are connected to the second external terminal electrodes 11. As shown in FIG. 6B, second dummy internal conductors 41 are further provided at an interface between the ceramic layers 2 on which the second same-polarity-connection conductor 19*a* is provided. The second dummy internal conductors 41 are not connected to the second same-polarity-connection conductor 19*a* but are connected to the first external terminal electrodes 10. The first and second dummy internal conductors 40 and 41 can advantageously reduce the influence of dents and steps caused by the presence of the leading portions 20 and 21 of the first and second same-polarity-connection conductors 18*a* and 19*a*, respectively.

The first and second dummy internal conductors 40 and 41 may be located adjacent to the second and first external terminal electrodes 11 and 10, instead of being connected to the second and first external terminal electrodes 11 and 10, respectively. The dummy internal conductors 40 and 41 may be used in the first preferred embodiment described above.

Figure 7A:
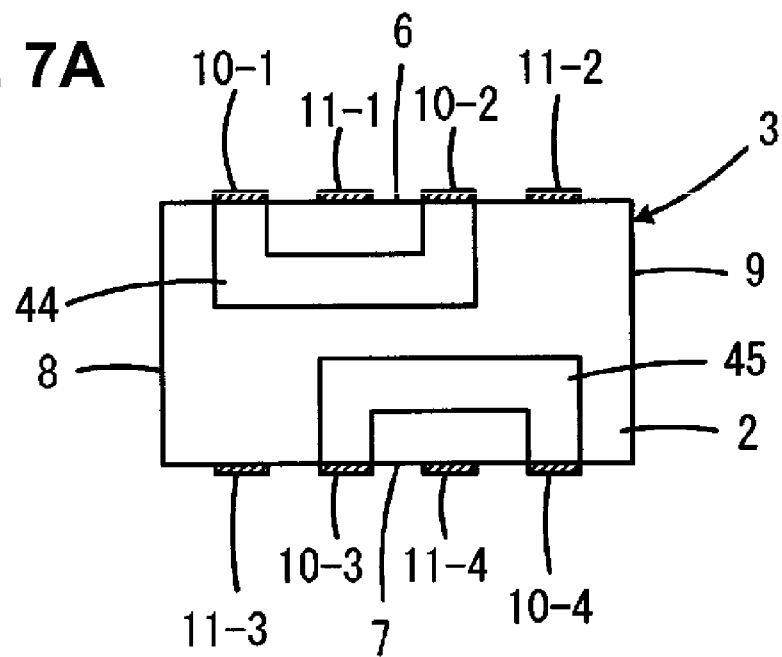
FIGS. 7A and 7B are diagrams of a monolithic ceramic capacitor according to a fourth preferred embodiment of the present invention, corresponding to FIGS. 3A and 3D.
Figure 7B:
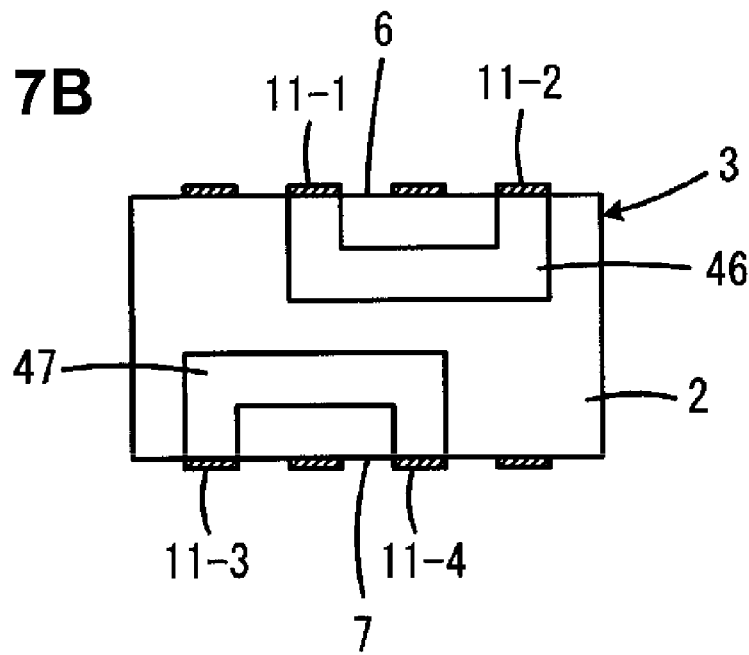

FIGS. 7A and 7B show a monolithic ceramic capacitor according to a fourth preferred embodiment of the present invention. The monolithic ceramic capacitor according to the fourth preferred embodiment includes another modification of the same-polarity-connection conductors 18 and 19 according to the first preferred embodiment. FIGS. 7A and 7B correspond to FIGS. 3A and 3D. In FIGS. 7A and 7B, elements corresponding to those shown in FIGS. 3A and 3D are assigned the same reference numerals, and will not be described herein.

In the fourth preferred embodiment, as shown in FIGS. 7A and 7B, first same-polarity-connection conductors 44 and 45 and second same-polarity-connection conductors 46 and 47 are provided. As shown in FIG. 7A, the first same-polarity-connection conductor 44 is electrically connected to only the first external terminal electrodes 10-1 and 10-2 provided on the first side surface 6, and the first same-polarity-connection conductor 45 is electrically connected to only the first external terminal electrodes 10-3 and 10-4 provided on the second side surface 7. As shown in FIG. 7B, the second same-polarity-connection conductor 46 is electrically connected to only the second external terminal electrodes 11-1 and 11-2 provided on the first side surface 6, and the second same-polarity-connection conductor 47 is electrically connected to only the second external terminal electrodes 11-3 and 11-4 provided on the second side surface 7. Each of the same-polarity-connection conductors 44 to 47 has a line shape with a predetermined width.

FIGS. 8A to 8D are diagrams of a monolithic ceramic capacitor 1*a* according to a fifth preferred embodiment of the present invention, corresponding to FIGS. 3A to 3D. In the fifth preferred embodiment, a modification of the capacitors 16 and 17 according to the first preferred embodiment is provided. In FIGS. 8A to 8D, elements corresponding to those shown in FIGS. 3A to 3D are assigned the same reference numerals, and will not be described herein.

In the fifth preferred embodiment, as shown in FIGS. 8B and 8C, a plurality of internal electrodes that are located on the same ceramic layer 2 extend to the same side surface.

More specifically, the first internal electrodes 12 and the fourth internal electrodes 15 are provided on the ceramic layer 2 shown in FIG. 8B. The first internal electrodes 12-1 and 12-2 are electrically connected to the first external terminal electrodes 10-1 and 10-2, respectively, and the fourth internal electrodes 15-1 and 15-2 are electrically connected to the second external terminal electrodes 11-1 and 11-2, respectively.

The second internal electrodes 13 and the third internal electrode 14 are provided on the ceramic layer 2 shown in FIG. 8C. The second internal electrodes 13-1 and 13-2 are electrically connected to the second external terminal electrodes 11-3 and 11-4, respectively, and the third internal electrodes 14-1 and 14-2 are electrically connected to the first external terminal electrodes 10-3 and 10-4, respectively.

Accordingly, on the ceramic layer 2 shown in FIG. 8B, the first internal electrodes 12 and the fourth internal electrodes 15, which are connected to different potentials, are alternately arranged. On the ceramic layer 2 shown in FIG. 8C, the second internal electrodes 13 and the third internal electrodes 14, which are connected to different potentials, are alternately arranged. Also in the fifth preferred embodiment, a current flows through the internal electrodes 12 to 15 so that directions of currents flowing through adjacent internal electrodes that are located on the same ceramic layer 2 are opposite to one another.

In the fifth preferred embodiment, the first same-polarity-connection conductor 18 faces the fourth internal electrodes 15 through the ceramic layers 2. This permits the generation of a small amount of capacitance between the first same-polarity-connection conductor 18 and the fourth internal electrodes 15. The second same-polarity-connection conductor 19 faces the third internal electrodes 14 through the ceramic layers 2. This permits the generation of a small amount of capacitance between the second same-polarity-connection conductor 19 and the third internal electrodes 14. Although not shown in the figures, the first same-polarity-connection conductor 18 may face the second internal electrodes 13, and the second same-polarity-connection conductor 19 may face the first internal electrodes 12. In such cases, a small amount of capacitance is also generated.

As described above, even if a small amount of capacitance is generated, the ESL can be reduced when the monolithic ceramic capacitor 1a is mounted on the wiring substrate 24 in the manner shown in FIG. 4. That is, when the monolithic ceramic capacitor 1a is mounted so that either of the first and second principal surfaces 4 and 5 of the capacitor body 3 is in contact with the wiring substrate 24, the same-polarity-connection conductor 18 or 19 having a large number of current paths or a large number of leading portions is arranged in a portion that is in close proximity to the wiring substrate 24 and in which a minimum loop inductance occurs. Therefore, the ESL can be reduced.

In the fifth preferred embodiment described above, as shown in FIGS. 8A and 8D, the same-polarity-connection conductors 18 and 19, which are similar to those of the first preferred embodiment, are used. Alternatively, the same-polarity-connection conductors 18a and 19a or 44 to 47 according to any of the second to fourth preferred embodiments shown in FIGS. 5A to 7B may be used. The use of the same-polarity-connection conductors 18a and 19a or 44 to 47 is preferable for the design of a capacitor because it is possible to further reduce the small amount of capacitance described above.

FIGS. 9A to 9D are diagrams of a monolithic ceramic capacitor 1b according to a sixth preferred embodiment of the present invention, corresponding to FIGS. 3A to 3D. In FIGS. 9A to 9D, elements corresponding to those shown in FIGS. 3A to 3D are assigned the same reference numerals, and will not be described herein.

In the sixth preferred embodiment, two capacitors are provided, and each internal electrode includes two leading portions.

Figure 9A:
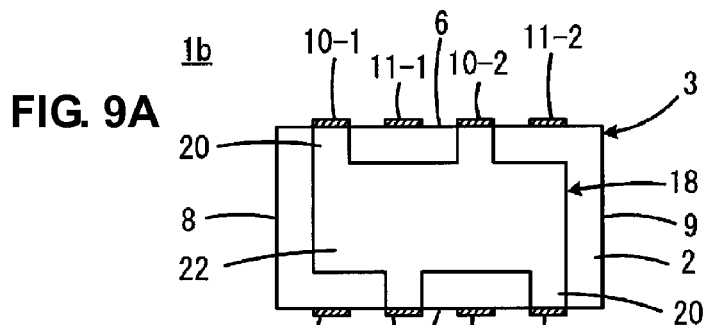
FIGS. 9A to 9D are diagrams of a monolithic ceramic capacitor according to a sixth preferred embodiment of the present invention, corresponding to FIGS. 3A to 3D.
Figure 9B:
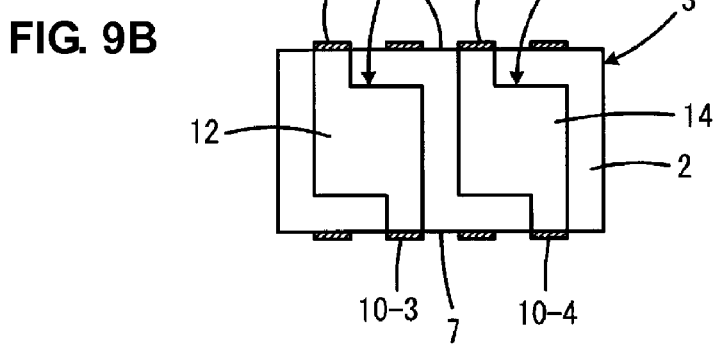

More specifically, a first internal electrode 12 and a third internal electrode 14 are provided on the ceramic layer 2 shown in FIG. 9B. The first internal electrode 12 is electrically connected to the first external terminal electrodes 10-1 and 10-3, and the third internal electrode 14 is electrically connected to the first external terminal electrodes 10-2 and 10-4.

Figure 9C:
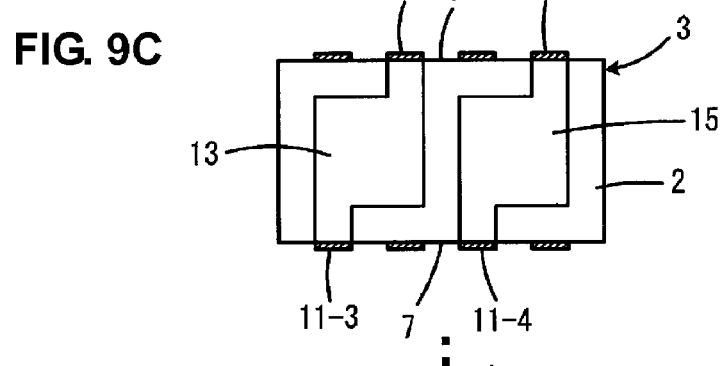

A second internal electrode 13 and a fourth internal electrode 15 are provided on the ceramic layer 2 shown in FIG. 9C. The second internal electrode 13 is electrically connected to the second external terminal electrodes 11-1 and 11-3, and the fourth internal electrode 15 is electrically connected to the second external terminal electrodes 11-2 and 11-4.

Accordingly, a single first capacitor unit 16 is provided inside the capacitor body 3, the first capacitor unit 16 having a capacitance that is provided by arranging the first internal electrode 12 and the second internal electrode 13 with a specific one of the ceramic layers 2 therebetween. A single second capacitor unit 17 is further provided, the second capacitor unit 17 having a capacitance that is provided by arranging the third internal electrode 14 and the fourth internal electrode 15 with a specific one of the ceramic layers 2 therebetween. The first and second capacitors 16 and 17 are arranged adjacent to each other in a plan view of the ceramic layers 2 in a manner similar to that of the other preferred embodiments.

Figure 9D:
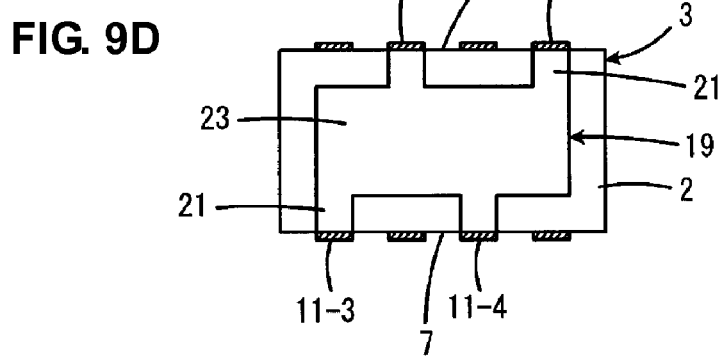

The first and second same-polarity-connection conductors 18 and 19 shown in FIGS. 9A and 9D, respectively, are provided so as to extend over the first capacitor 16 and the second capacitor 17 in a manner similar to that of the other preferred embodiments.

Also in the sixth preferred embodiment, a current flows through the internal electrodes 12 to 15 so that directions of currents flowing through adjacent internal electrodes that are located on the same ceramic layer 2, i.e., the first internal electrode 12 and the third internal electrode 14, and the second internal electrode 13 and the fourth internal electrode 15, or, more specifically, at least opposing portions thereof, are opposite to one another. This enables a reduction in ESL.

FIGS. 10A and 10B show a monolithic ceramic capacitor according to a seventh preferred embodiment of the present invention. In the seventh preferred embodiment, a modification of the same-polarity-connection conductors 18 and 19 according to the sixth preferred embodiment described above is provided.

FIGS. 10A and 10B correspond to FIGS. 9A and 9D. In FIGS. 10A and 10B, elements corresponding to those shown in FIGS. 9A and 9D are assigned the same reference numerals, and will not be described herein.

In the seventh preferred embodiment, as shown in FIG. 10A, a first same-polarity-connection conductor 50 is provided so as to connect only the first external terminal electrodes 10-2 and 10-3. As shown in FIG. 10B, a second same-polarity-connection conductor 51 is provided so as to connect only the second external terminal electrodes 11-1 and 11-4. The first and second same-polarity-connection conductors 50 and 51 ensure a connection path for minimum backup.

Figure 11A:
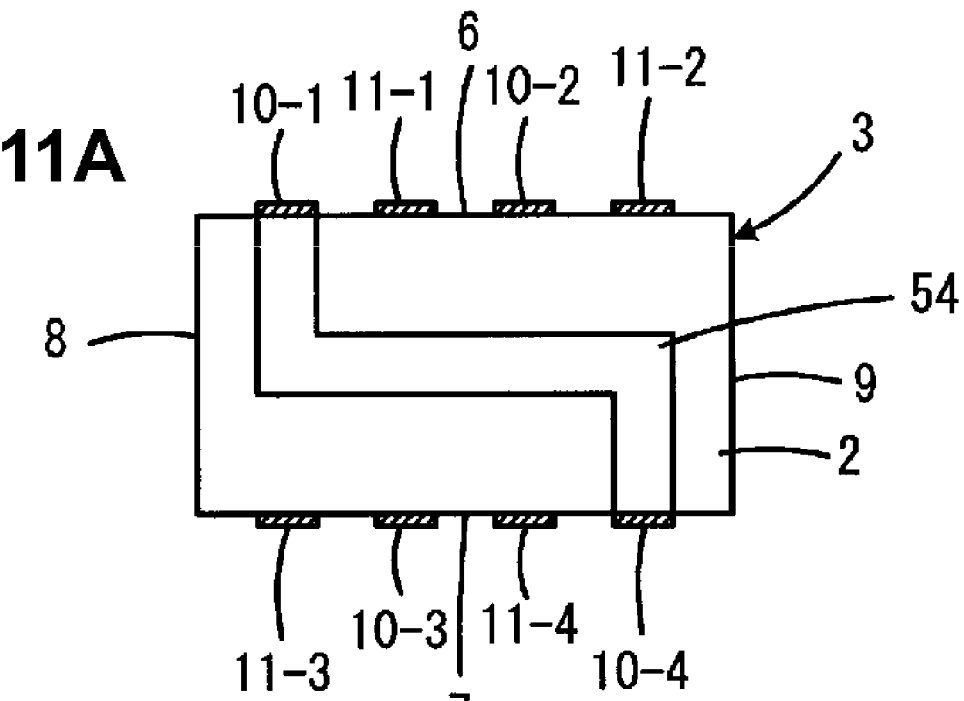
FIGS. 11A and 11B are diagrams of a monolithic ceramic capacitor according to an eighth preferred embodiment of the present invention, corresponding to FIGS. 9A and 9D.
Figure 11B:
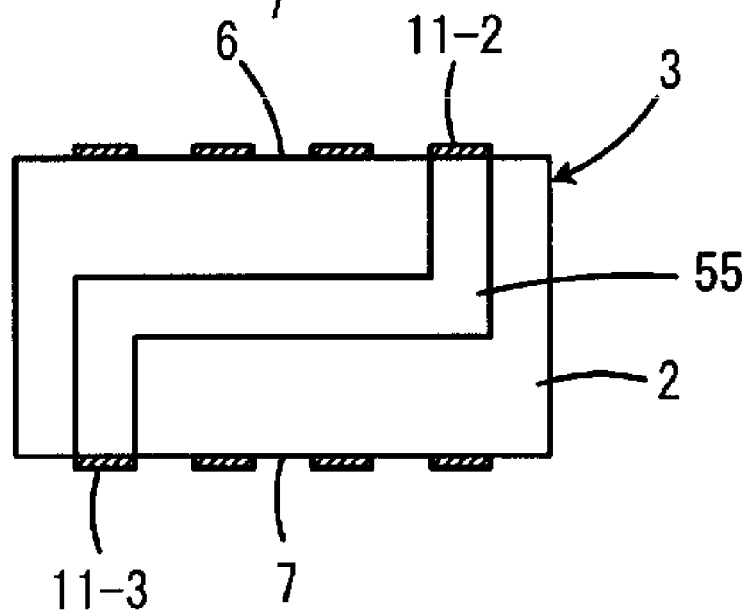

FIGS. 11A and 11B show a monolithic ceramic capacitor according to an eighth preferred embodiment of the present invention. Similar to the seventh preferred embodiment, in the eighth preferred embodiment, a modification of the same-polarity-connection conductors 18 and 19 of the sixth preferred embodiment is provided. FIGS. 11A and 11B correspond to FIGS. 9A and 9D. In FIGS. 11A and 11B, elements corresponding to those shown in FIGS. 9A and 9D are assigned the same reference numerals, and will not be described herein.

In the eighth preferred embodiment, as shown in FIG. 11A, a first same-polarity-connection conductor 54 is provided so as to connect the first external terminal electrodes 10-1 and 10-4. As shown in FIG. 11B, a second same-polarity-connection conductor 55 is provided so as to connect the second external terminal electrodes 11-2 and 11-3. The first and second same-polarity-connection conductors 54 and 55 ensure a connection path for minimum backup.

FIGS. 12A to 12F are diagrams of a monolithic ceramic capacitor 1c according to a ninth preferred embodiment of the present invention, corresponding to FIGS. 3A to 3D. In FIGS. 12A to 12F, elements corresponding to those shown in FIGS. 3A to 3D are assigned the same reference numerals, and will not be described herein.

FIGS. 12A to 12F also represent a lamination order. In the ninth preferred embodiment, a plurality of first same-polarity-connection conductors 18 are provided inside the capacitor body 3 so as to be arranged in the lamination direction, and a plurality of second same-polarity-connection conductors 19 are further provided so as to be arranged in the lamination direction.

With this structure, the connection reliability between the first same-polarity-connection conductors 18 and the first external terminal electrodes 10 is improved, and the connection reliability between the second same-polarity-connection conductors 19 and the second external terminal electrodes 11 is also improved. Thus, more reliable backup in the case of disconnection is achieved. Preferably, the plurality of first same-polarity-connection conductors 18 are successively arranged across, for example, about three layers to about ten layers in the lamination direction, and the plurality of second same-polarity-connection conductors 19 are successively arranged across, for example, about three layers to about ten layers in the lamination direction.

FIGS. 13A to 13H are diagrams of a monolithic ceramic capacitor 1d according to a tenth preferred embodiment of the present invention, corresponding to FIGS. 3A to 3D. In FIGS. 13A to 13H, elements corresponding to those shown in FIGS. 3A to 3D are assigned the same reference numerals, and will not be described herein.

In the tenth preferred embodiment, same-polarity-connection conductors 18 and same-polarity-connection conductors 19 are arranged in the vicinity of an approximate center in the lamination direction of the capacitor body 3.

More specifically, as shown in FIGS. 13A, 13B, 13G, and 13H, internal electrodes 12 to 15 are provided at ends of the capacitor body 3 in the lamination direction thereof. As shown in FIGS. 13C to 13F, buffer areas having no internal electrodes are provided in the vicinity of an approximate center in the lamination direction. The first and second same-polarity-connection conductors 18 and 19 are arranged in the buffer areas.

If the ceramic layers 2 are made of a high-dielectric-constant ceramic material, the capacitor body 3 expands and contracts due to the electrostriction effect of the dielectric. The stress of the expansion and contraction may crack the capacitor body 3. The buffer areas described above reduce the stress to prevent or reduce the occurrence of cracking. If the buffer areas include only the ceramic layers 2, the bending strength is reduced. Thus, as described above, the same-polarity-connection conductors 18 and 19 are arranged in the buffer areas. The same-polarity-connection conductors 18 and 19 therefore achieve the advantage of improved strength as well as backup in the case of disconnection.

In the tenth preferred embodiment, similar to the ninth preferred embodiment, the plurality of first same-polarity-connection conductors 18 are arranged in the lamination direction, and the plurality of second same-polarity-connection conductors 19 are also arranged in the lamination direction. Preferably, the first same-polarity-connection conductors 18 are collectively laminated and the second same-polarity-connection conductors 19 are collectively laminated so that unwanted capacitance provided between the first and second same-polarity-connection conductors 18 and 19 is minimized.

As a modification of the tenth preferred embodiment, a same-polarity-connection conductor different from the same-polarity-connection conductors 18 and 19 shown in the figures may further be provided in a layer other than the layers in which the internal electrodes 12 to 15 are provided.

FIGS. 14A to 14F are diagrams of a monolithic ceramic capacitor 1e according to an eleventh preferred embodiment of the present invention, corresponding to FIGS. 3A to 3D. In FIGS. 14A to 14F, elements corresponding to those shown in FIGS. 3A to 3D are assigned the same reference numerals, and will not be described herein.

FIGS. 14A to 14F also represent a lamination order. In the eleventh preferred embodiment, a first same-polarity-connection conductor 18 shown in FIG. 14B includes a same-polarity-connection conductor that is arranged so as to face first and third internal electrodes 12 and 14 shown in FIG. 14C through a corresponding one of the ceramic layers 2 and that is arranged so as to face a second same-polarity-connection conductor 19 shown in FIG. 14A, on a side opposite to the side on which the first and third internal electrodes 12 and 14 are located, through a corresponding one of the ceramic layers 2.

Figure 14A:
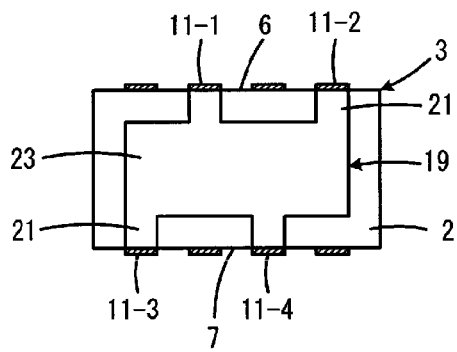
FIGS. 14A to 14F are diagrams of a monolithic ceramic capacitor according to an eleventh preferred embodiment of the present invention, corresponding to FIGS. 3A to 3D.
Figure 14B:
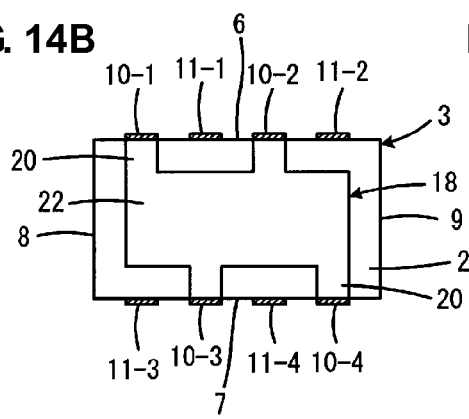
Figure 14C:
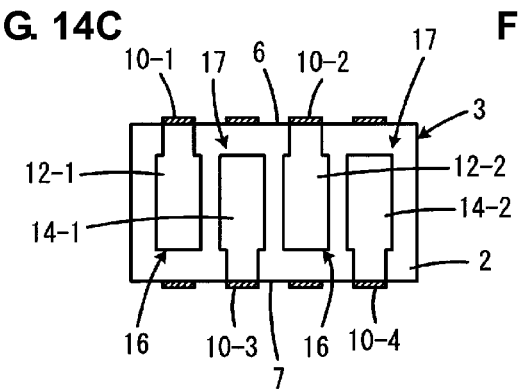
Figure 14D:
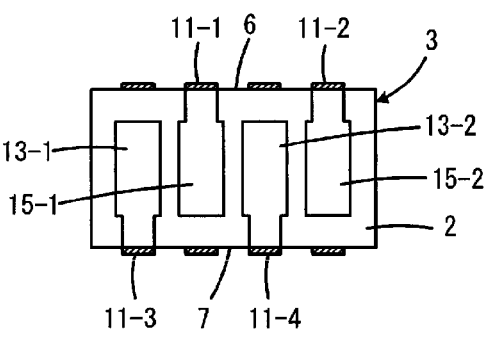
Figure 14E:
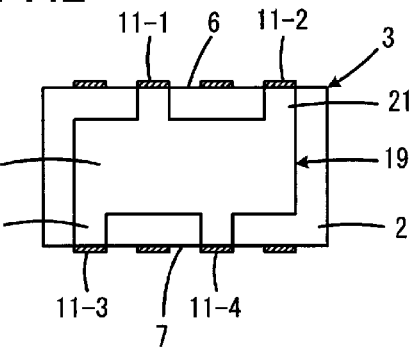
Figure 14F:
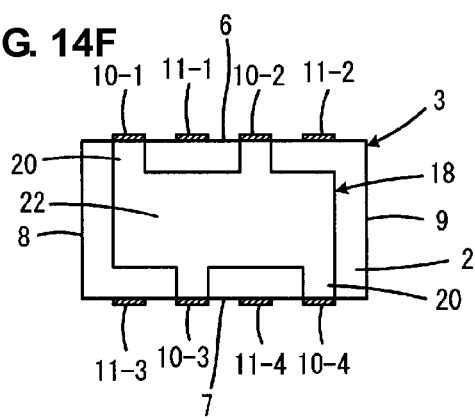

A second same-polarity-connection conductor 19 shown in FIG. 14E also includes a same-polarity-connection conductor that is arranged so as to face second and fourth internal electrodes 13 and 15 shown in FIG. 14D through a corresponding one of the ceramic layers 2 and that is arranged so as to face a first same-polarity-connection conductor 18 shown in FIG. 14F, on a side opposite to the side on which the second and fourth internal electrodes 13 and 15 are located, through a corresponding one of the ceramic layers 2.

With this structure, no capacitance is generated between the first same-polarity-connection conductors 18 and the first and third internal electrodes 12 and 14, and no capacitance is generated between the second same-polarity-connection conductors 19 and the second and fourth internal electrodes 13 and 15. On the other hand, a capacitance is generated between the second same-polarity-connection conductor 19 shown in FIG. 14A and the first same-polarity-connection conductor 18 shown in FIG. 14B, and a capacitance is generated between the second same-polarity-connection conductor 19 shown in FIG. 14E and the first same-polarity-connection conductor 18 shown in FIG. 14F. By adjusting the capacitances generated between the first same-polarity-connection conductors 18 and the second same-polarity-connection conductors 19, the overall capacitance of the monolithic ceramic capacitor 1e can be finely adjusted.

In the illustrated preferred embodiment, an arrangement in which a capacitance is generated between a first same-polarity-connection conductor 18 and a second same-polarity-connection conductor 19 is provided in two places. Alternatively, such an arrangement may be provided in one place or in three or more places.

While the present invention has been described with reference to the illustrated preferred embodiments, a variety of other modifications may be made without departing from the scope of the present invention.

For example, each of first and second same-polarity-connection conductors may be configured so as to have a combination of different patterns, instead of a single pattern, within a single capacitor body.

Further, the illustrated preferred embodiments provide a second same-polarity-connection conductor. However, it is to be understood that a preferred embodiment which does not provide a second same-polarity-connection conductor may also fall within the scope of the present invention.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:
1. A monolithic ceramic capacitor comprising:
a capacitor body including a plurality of laminated ceramic layers and having a first principal surface, a second principal surface facing the first principal surface, and side surfaces connecting the first principal surface and the second principal surface;

a plurality of first external terminal electrodes each of which is connected to a first potential, the first external terminal electrodes being provided on the side surfaces of the capacitor body;

a plurality of second external terminal electrodes each of which is connected to a second potential, the second external terminal electrodes being provided on the side surfaces of the capacitor body;

a first internal electrode provided inside the capacitor body and electrically connected to at least one of the plurality of first external terminal electrodes;

a second internal electrode provided inside the capacitor body and electrically connected to at least one of the plurality of second external terminal electrodes;

a third internal electrode provided inside the capacitor body and electrically connected to at least one of the plurality of first external terminal electrodes;

a fourth internal electrode provided inside the capacitor body and electrically connected to at least one of the plurality of second external terminal electrodes;

at least one first capacitor provided inside the capacitor body, and having a capacitance that is provided by arranging the first internal electrode and the second internal electrode with a specific one of the ceramic layers therebetween;

at least one second capacitor provided inside the capacitor body so as to be arranged adjacent to the at least one first capacitor in a plan view of the ceramic layers, the at least one second capacitor having a capacitance that is provided by arranging the third internal electrode and the fourth internal electrode with a specific one of the ceramic layers therebetween; and at least one first same-polarity-connection conductor provided on one of the plurality of laminated ceramic layers inside the capacitor body, the at least one first same-polarity-connection conductor extending over at least two capacitors selected from the at least one first capacitor and the at least one second capacitor and being electrically connected to at least two of the plurality of first external terminal electrodes; wherein the side surfaces of the capacitor body include a first side surface and a second side surface facing the first side surface;

the at least one first same-polarity-connection conductor includes a singular main body portion and a plurality of leading portions extending from the singular main body portion;

at least two of the plurality of leading portions extend from the singular main body portion to each of the first and second side surfaces;

a shape of each of the at least one same-polarity-connection conductor is different from each of a shape of the first, second, third, and fourth internal electrodes; and each of the plurality of first external terminal electrodes and each of the plurality of second external electrodes is connected to at least one of the first, second, third, and fourth internal electrodes.

2. The monolithic ceramic capacitor according to claim 1, wherein the monolithic ceramic capacitor is connected to an external circuit such that a current flows through the first, second, third, and fourth internal electrodes so that directions of currents flowing through at least opposing portions of adjacent one of the first, second, third, and fourth internal electrodes that are located on a common ceramic layer are opposite to one another.

3. The monolithic ceramic capacitor according to claim 1, wherein the first internal electrode is electrically connected to only one of the plurality of first external terminal electrodes, the second internal electrode is electrically connected to only one of the plurality of second external terminal electrodes, the third internal electrode is electrically connected to only one of the plurality of first external terminal electrodes, and the fourth internal electrode is electrically connected to only one of the plurality of second external terminal electrodes.

4. The monolithic ceramic capacitor according to claim 3, wherein the first internal electrode and the third internal electrode are disposed on a first ceramic layer of the plurality of laminated ceramic layers, the second internal electrode and the fourth internal electrode are provided on a second ceramic layer of the plurality of laminated ceramic layers, the first internal electrode extends to the first side surface, the second internal electrode extends to the second side surface, the third internal electrode extends to the second side surface, and the fourth internal electrode extends to the first side surface.

5. The monolithic ceramic capacitor according to claim 1, wherein the first internal electrode is electrically connected to at least two of the plurality of first external terminal electrodes, the second internal electrode is electrically connected to at least two of the plurality of second external terminal electrodes, the third internal electrode is electrically connected to at least two of the plurality of first external terminal electrodes, and the fourth internal electrode is electrically connected to at least two of the plurality of second external terminal electrodes.

6. The monolithic ceramic capacitor according to claim 1, wherein the at least one first same-polarity-connection conductor is electrically connected to all of the plurality of first external terminal electrodes.

7. The monolithic ceramic capacitor according to claim 1, wherein the at least one first same-polarity-connection conductor includes a single first same-polarity-connection conductor provided inside the capacitor body.

8. The monolithic ceramic capacitor according to claim 1, wherein the at least one first same-polarity-connection conductor includes a plurality of first same-polarity-connection conductors provided inside the capacitor body and arranged in the lamination direction of the plurality of laminated ceramic layers.

9. The monolithic ceramic capacitor according to claim 1, wherein the singular main body portion of each of the at least one first same-polarity-connection conductor has a relatively large area, and the plurality of leading portions are electrically connected to the plurality of first external terminal electrodes.

10. The monolithic ceramic capacitor according to claim 1, wherein each of the at least one first same-polarity-connection conductor has a line shape.

11. The monolithic ceramic capacitor according to claim 10, wherein, when viewed from an interface between the ceramic layers, an area occupied by an exposed portion of the ceramic layers is greater than an area occupied by each of the at least one first same-polarity-connection conductor.

12. The monolithic ceramic capacitor according to claim 1, further comprising a first dummy internal conductor provided at an interface between the ceramic layers on which each of the at least one first same-polarity-connection conductor is provided, the first dummy internal conductor being connected to or disposed close to the second external terminal electrodes but not being connected to the first same-polarity-connection conductor.

13. The monolithic ceramic capacitor according to claim 1, wherein the at least one first same-polarity-connection conductor includes a same-polarity-connection conductor arranged so as to face the first internal electrode and the third internal electrode through one of the ceramic layers and so as not to produce a capacitance between the same-polarity-connection conductor and the first internal electrode and the third internal electrode.

14. The monolithic ceramic capacitor according to claim 1, wherein the at least one first same-polarity-connection conductor includes a same-polarity-connection conductor that is disposed close to at least one of the first principal surface and the second principal surface and that is arranged so as to face at least one of the second internal electrode and the fourth internal electrode through one of the ceramic layers.

15. The monolithic ceramic capacitor according to claim 1, wherein a buffer area in which none of the first, second, third, and fourth internal electrodes is disposed is provided in an area including the approximate center in the lamination direction of the capacitor body, and the at least one first same-polarity-connection conductor includes a same-polarity-connection conductor arranged in the buffer area.

16. The monolithic ceramic capacitor according to claim 1, further comprising a second same-polarity-connection conductor provided inside the capacitor body, the second same-polarity-connection conductor extending over at least two capacitors selected from the at least one first capacitor and the at least one second capacitor and being electrically connected to at least two of the plurality of second external terminal electrodes.

17. The monolithic ceramic capacitor according to claim 16, wherein the at least one first same-polarity-connection conductor includes a same-polarity-connection conductor that is arranged so as to face the first internal electrode and the third internal electrode through one of the ceramic layers and that is arranged so as to face the second same-polarity-connection conductor, on a side opposite to a side on which the first internal electrode and the third internal electrode are located, through another of the ceramic layers.

18. A monolithic ceramic capacitor comprising:
a capacitor body including a plurality of laminated ceramic layers and having a first principal surface, a second principal surface facing the first principal surface, and side surfaces connecting the first principal surface and the second principal surface;
a plurality of first external terminal electrodes each of which is connected to a first potential, the first external terminal electrodes being provided on the side surfaces of the capacitor body;
a plurality of second external terminal electrodes each of which is connected to a second potential, the second external terminal electrodes being provided on the side surfaces of the capacitor body;
a first internal electrode provided inside the capacitor body and electrically connected to at least one of the plurality of first external terminal electrodes;
a second internal electrode provided inside the capacitor body and electrically connected to at least one of the plurality of second external terminal electrodes;
a third internal electrode provided inside the capacitor body and electrically connected to at least one of the plurality of first external terminal electrodes;
a fourth internal electrode provided inside the capacitor body and electrically connected to at least one of the plurality of second external terminal electrodes;
at least one first capacitor provided inside the capacitor body, and having a capacitance that is provided by arranging the first internal electrode and the second internal electrode with a specific one of the ceramic layers therebetween;

at least one second capacitor provided inside the capacitor body so as to be arranged adjacent to the at least one first capacitor in a plan view of the ceramic layers, the at least one second capacitor having a capacitance that is provided by arranging the third internal electrode and the fourth internal electrode with a specific one of the ceramic layers therebetween; and
at least one first same-polarity-connection conductor provided on one of the plurality of laminated ceramic layers inside the capacitor body, the at least one first same-polarity-connection conductor extending over at least two capacitors selected from the at least one first capacitor and the at least one second capacitor and being electrically connected to at least two of the plurality of first external terminal electrodes; wherein
the side surfaces of the capacitor body include a first side surface and a second side surface facing the first side surface;
the at least one first same-polarity-connection conductor includes a main body portion and a plurality of leading portions extending from the main body portion;
at least two of the plurality of leading portions extend from the main body portion to each of the first and second side surfaces;
a shape of each of the at least one same-polarity-connection conductor is different from each of a shape of the first, second, third, and fourth internal electrodes;
each of the plurality of first external terminal electrodes and each of the plurality of second external electrodes is connected to at least one of the first, second, third, and fourth internal electrodes; and
the first internal electrode is electrically connected to only one of the plurality of first external terminal electrodes, the second internal electrode is electrically connected to only one of the plurality of second external terminal electrodes, the third internal electrode is electrically connected to only one of the plurality of first external terminal electrodes, and the fourth internal electrode is electrically connected to only one of the plurality of second external terminal electrodes.

19. The monolithic ceramic capacitor according to claim 18, wherein the monolithic ceramic capacitor is connected to an external circuit such that a current flows through the first, second, third, and fourth internal electrodes so that directions of currents flowing through at least opposing portions of adjacent one of the first, second, third, and fourth internal electrodes that are located on a common ceramic layer are opposite to one another.

20. The monolithic ceramic capacitor according to claim 18, wherein the at least one first same-polarity-connection conductor is electrically connected to all of the plurality of first external terminal electrodes.

21. The monolithic ceramic capacitor according to claim 18, wherein the at least one first same-polarity-connection conductor includes a single first same-polarity-connection conductor provided inside the capacitor body.

22. The monolithic ceramic capacitor according to claim 18, wherein the at least one first same-polarity-connection conductor includes a plurality of first same-polarity-connection conductors provided inside the capacitor body and arranged in the lamination direction of the plurality of laminated ceramic layers.

23. The monolithic ceramic capacitor according to claim 18, wherein the main body portion of each of the at least one first same-polarity-connection conductor has a relatively large area, and the plurality of leading portions are electrically connected to the plurality of first external terminal electrodes.

24. The monolithic ceramic capacitor according to claim 18, wherein each of the at least one first same-polarity-connection conductor has a line shape.

25. The monolithic ceramic capacitor according to claim 24, wherein, when viewed from an interface between the ceramic layers, an area occupied by an exposed portion of the ceramic layers is greater than an area occupied by each of the at least one first same-polarity-connection conductor.

26. The monolithic ceramic capacitor according to claim 18, further comprising a first dummy internal conductor provided at an interface between the ceramic layers on which each of the at least one first same-polarity-connection conductor is provided, the first dummy internal conductor being connected to or disposed close to the second external terminal electrodes but not being connected to the first same-polarity-connection conductor.

27. The monolithic ceramic capacitor according to claim 18, wherein the at least one first same-polarity-connection conductor includes a same-polarity-connection conductor arranged so as to face the first internal electrode and the third internal electrode through one of the ceramic layers and so as not to produce a capacitance between the same-polarity-connection conductor and the first internal electrode and the third internal electrode.

28. The monolithic ceramic capacitor according to claim 18, wherein the at least one first same-polarity-connection conductor includes a same-polarity-connection conductor that is disposed close to at least one of the first principal surface and the second principal surface and that is arranged so as to face at least one of the second internal electrode and the fourth internal electrode through one of the ceramic layers.

29. The monolithic ceramic capacitor according to claim 18, wherein a buffer area in which none of the first, second, third, and fourth internal electrodes is disposed is provided in an area including the approximate center in the lamination direction of the capacitor body, and the at least one first same-polarity-connection conductor includes a same-polarity-connection conductor arranged in the buffer area.

30. The monolithic ceramic capacitor according to claim 18, further comprising a second same-polarity-connection conductor provided inside the capacitor body, the second same-polarity-connection conductor extending over at least two capacitors selected from the at least one first capacitor and the at least one second capacitor and being electrically connected to at least two of the plurality of second external terminal electrodes.

31. The monolithic ceramic capacitor according to claim 30, wherein the at least one first same-polarity-connection conductor includes a same-polarity-connection conductor that is arranged so as to face the first internal electrode and the third internal electrode through one of the ceramic layers and that is arranged so as to face the second same-polarity-connection conductor, on a side opposite to a side on which the first internal electrode and the third internal electrode are located, through another of the ceramic layers.

32. The monolithic ceramic capacitor according to claim 18, wherein the first internal electrode and the third internal electrode are disposed on a first ceramic layer of the plurality of laminated ceramic layers, the second internal electrode and the fourth internal electrode are provided on a second ceramic layer of the plurality of laminated ceramic layers, the first internal electrode extends to the first side surface, the second internal electrode extends to the second side surface, the third internal electrode extends to the second side surface, and the fourth internal electrode extends to the first side surface.

33. A monolithic ceramic capacitor comprising:
a capacitor body including a plurality of laminated ceramic layers and having a first principal surface, a second principal surface facing the first principal surface, and side surfaces connecting the first principal surface and the second principal surface;
a plurality of first external terminal electrodes each of which is connected to a first potential, the first external terminal electrodes being provided on the side surfaces of the capacitor body;
a plurality of second external terminal electrodes each of which is connected to a second potential, the second external terminal electrodes being provided on the side surfaces of the capacitor body;
a first internal electrode provided inside the capacitor body and electrically connected to at least one of the plurality of first external terminal electrodes;
a second internal electrode provided inside the capacitor body and electrically connected to at least one of the plurality of second external terminal electrodes;
a third internal electrode provided inside the capacitor body and electrically connected to at least one of the plurality of first external terminal electrodes;
a fourth internal electrode provided inside the capacitor body and electrically connected to at least one of the plurality of second external terminal electrodes;
at least one first capacitor provided inside the capacitor body, and having a capacitance that is provided by arranging the first internal electrode and the second internal electrode with a specific one of the ceramic layers therebetween;
at least one second capacitor provided inside the capacitor body so as to be arranged adjacent to the at least one first capacitor in a plan view of the ceramic layers, the at least one second capacitor having a capacitance that is provided by arranging the third internal electrode and the fourth internal electrode with a specific one of the ceramic layers therebetween; and
at least one first same-polarity-connection conductor provided on one of the plurality of laminated ceramic layers inside the capacitor body, the at least one first same-polarity-connection conductor extending over at least two capacitors selected from the at least one first capacitor and the at least one second capacitor and being electrically connected to at least two of the plurality of first external terminal electrodes; wherein
the side surfaces of the capacitor body include a first side surface and a second side surface facing the first side surface;
the at least one first same-polarity-connection conductor includes a main body portion and a plurality of leading portions extending from the main body portion;
at least two of the plurality of leading portions extend from the main body portion to each of the first and second side surfaces;
a shape of each of the at least one same-polarity-connection conductor is different from each of a shape of the first, second, third, and fourth internal electrodes;
each of the plurality of first external terminal electrodes and each of the plurality of second external electrodes is connected to at least one of the first, second, third, and fourth internal electrodes; and
the at least one first same-polarity-connection conductor includes a single first same-polarity-connection conductor provided inside the capacitor body.

34. A monolithic ceramic capacitor comprising:

a capacitor body including a plurality of laminated ceramic layers and having a first principal surface, a second principal surface facing the first principal surface, and side surfaces connecting the first principal surface and the second principal surface;

a plurality of first external terminal electrodes each of which is connected to a first potential, the first external terminal electrodes being provided on the side surfaces of the capacitor body;

a plurality of second external terminal electrodes each of which is connected to a second potential, the second external terminal electrodes being provided on the side surfaces of the capacitor body;

a first internal electrode provided inside the capacitor body and electrically connected to at least one of the plurality of first external terminal electrodes;

a second internal electrode provided inside the capacitor body and electrically connected to at least one of the plurality of second external terminal electrodes;

a third internal electrode provided inside the capacitor body and electrically connected to at least one of the plurality of first external terminal electrodes;

a fourth internal electrode provided inside the capacitor body and electrically connected to at least one of the plurality of second external terminal electrodes;

at least one first capacitor provided inside the capacitor body, and having a capacitance that is provided by arranging the first internal electrode and the second internal electrode with a specific one of the ceramic layers therebetween;

at least one second capacitor provided inside the capacitor body so as to be arranged adjacent to the at least one first capacitor in a plan view of the ceramic layers, the at least one second capacitor having a capacitance that is provided by arranging the third internal electrode and the fourth internal electrode with a specific one of the ceramic layers therebetween; and at least one first same-polarity-connection conductor provided on one of the plurality of laminated ceramic layers inside the capacitor body, the at least one first same-polarity-connection conductor extending over at least two capacitors selected from the at least one first capacitor and the at least one second capacitor and being electrically connected to at least two of the plurality of first external terminal electrodes; wherein the side surfaces of the capacitor body include a first side surface and a second side surface facing the first side surface;

the at least one first same-polarity-connection conductor includes a main body portion and a plurality of leading portions extending from the main body portion;

at least two of the plurality of leading portions extend from the main body portion to each of the first and second side surfaces;

a shape of each of the at least one same-polarity-connection conductor is different from each of a shape of the first, second, third, and fourth internal electrodes;

each of the plurality of first external terminal electrodes and each of the plurality of second external electrodes is connected to at least one of the first, second, third, and fourth internal electrodes; and when viewed from an interface between the ceramic layers, an area occupied by an exposed portion of the ceramic layers is greater than an area occupied by each of the at least one first same-polarity-connection conductor

* * * * *